(12) United States Patent
Sato et al.

(10) Patent No.: US 12,475,500 B2
(45) Date of Patent: Nov. 18, 2025

(54) INFORMATION PROCESSING METHOD, INFORMATION PROCESSING APPARATUS, AND PROGRAM

(71) Applicant: FUJIFILM Corporation, Tokyo (JP)

(72) Inventors: Masahiro Sato, Tokyo (JP); Tomoki Taniguchi, Tokyo (JP); Tomoko Ohkuma, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 333 days.

(21) Appl. No.: 18/320,188

(22) Filed: May 18, 2023

(65) Prior Publication Data
US 2023/0377022 A1 Nov. 23, 2023

(30) Foreign Application Priority Data

May 20, 2022 (JP) .................. 2022-083028

(51) Int. Cl.
*G06Q 30/00* (2023.01)
*G06F 16/951* (2019.01)
*G06Q 30/0601* (2023.01)

(52) U.S. Cl.
CPC ....... *G06Q 30/0631* (2013.01); *G06F 16/951* (2019.01); *G06Q 30/0621* (2013.01)

(58) Field of Classification Search
CPC ................................................ G06Q 30/0631
See application file for complete search history.

(56) References Cited

U.S. PATENT DOCUMENTS

| 10,467,650 | B2 * | 11/2019 | Tsubouchi | G06N 5/025 |
| 11,250,951 | B2 | 2/2022 | Takata et al. | |
| 2014/0039915 | A1 * | 2/2014 | Dean | G16H 40/20 705/2 |
| 2020/0258056 | A1 * | 8/2020 | Endo | G06Q 10/047 |
| 2021/0234687 | A1 * | 7/2021 | Zhou | G06Q 10/10 |

(Continued)

FOREIGN PATENT DOCUMENTS

JP 6782802 11/2020

OTHER PUBLICATIONS

Panteli, Antiopi, and Basilis Boutsinas. "Improvement of similarity-diversity trade-off in recommender systems based on a facility location model." Neural Computing and Applications 35.1 (2023): 177-189.*

(Continued)

*Primary Examiner* — Kathleen Palavecino
(74) *Attorney, Agent, or Firm* — JCIPRNET

(57) ABSTRACT

An information processing method executed by one or more processors, in which a plurality of models, which are trained by using one or more of datasets including a behavior history of a user on an item, which is collected at each of a plurality of first facilities different from each other, are prepared, and the one or more processors include acquiring a characteristic of a second facility, which is different from the plurality of first facilities and acquiring a characteristic of each of the plurality of first facilities, evaluating a similarity degree between the acquired characteristic of the second facility and the characteristic of the first facility where the dataset, which is used for the training of the model, is collected, and selecting a model suitable for the second facility from among the plurality of models based on the similarity degree.

18 Claims, 23 Drawing Sheets

(56) References Cited

U.S. PATENT DOCUMENTS

2021/0390152 A1* 12/2021 Jang ................... G06N 20/00
2023/0153857 A1* 5/2023 Li ..................... G06Q 30/0202
                                                     705/14.49
2023/0267375 A1* 8/2023 Szeto .................. G16H 50/20
                                                       706/10
2024/0095777 A1* 3/2024 Ravindran ......... G06Q 30/0271

OTHER PUBLICATIONS

Yu-Hsiang Lin et al., "Choosing Transfer Languages for Cross-Lingual Learning," arXiv:1905.12688v2, Jun. 2019, pp. 1-11.
Bin Cao et al., "Transfer Learning for Collective Link Prediction in Multiple Heterogenous Domains," Proceedings of the 27 th International Conference on Machine Learning, Jun. 2010, pp. 1-8.
Iván Cantador et al., "Cross-Domain Recommender Systems," Recommender Systems Handbook, Chapter 27, Jan. 2015, pp. 919-959.

* cited by examiner

INFORMATION PROCESSING METHOD, INFORMATION PROCESSING APPARATUS, AND PROGRAM

CROSS-REFERENCE TO RELATED APPLICATION

The present application claims priority under 35 U.S.C § 119(a) to Japanese Patent Application No. 2022-083028 filed on May 20, 2022, which is hereby expressly incorporated by reference, in its entirety, into the present application.

BACKGROUND OF THE INVENTION

1. Field of the Invention

The present disclosure relates to an information processing method, an information processing apparatus, and a program, and more particularly to an information suggestion technique for making a robust suggestion for a domain shift.

2. Description of the Related Art

In a system that provides various items to a user, such as an electronic commerce (EC) site or a document information management system, it is difficult for the user to select the best item that suits the user from among many items in terms of time and cognitive ability. The item in the EC site is a product handled in the EC site, and the item in the document information management system is document information stored in the system.

In order to assist the user in selecting an item, an information suggestion technique, which is a technique of presenting a selection candidate from a large number of items, has been studied. In general, in a case where a suggestion system is introduced into a certain facility or the like, a model of the suggestion system is trained based on data collected at the introduction destination facility or the like. However, in a case where the same suggestion system is introduced in a facility different from the facility where the data used for the training is collected, there is a problem that the prediction accuracy of the model is decreased. The problem that a machine learning model does not work well at unknown other facilities is called domain shift, and research related to domain generalization, which is research on improving robustness against the domain shift, has been active in recent years, mainly in the field of image recognition. However, there have been few research cases on domain generalization in the information suggestion technique.

A method of selecting a model, which is used for a transition learning, that is, a pre-trained model for a fine-tuning among a plurality of models trained in several different languages in interlanguage transition learning applied to cross-language translation, is disclosed in Yu-Hsiang Lin, Chian-Yu Chen, Jean Lee, Zirui Li, Yuyan Zhang, Mengzhou Xia, Shruti Rijhwani, Junxian He, Zhisong Zhang, Xuezhe Ma, Antonios Anastasopoulos, Patrick Littell, Graham Neubig "Choosing Transfer Languages for Cross-Lingual Learning" (ACL 2019). In order to perform transition learning between languages, a similarity degree between a target domain and a source domain is estimated based on some feature amounts in Yu-Hsiang Lin, Chian-Yu Chen, Jean Lee, Zirui Li, Yuyan Zhang, Mengzhou Xia, Shruti Rijhwani, Junxian He, Zhisong Zhang, Xuezhe Ma, Antonios Anastasopoulos, Patrick Littell, Graham Neubig "Choosing Transfer Languages for Cross-Lingual Learning" (ACL 2019). The feature amounts used to estimate the similarity degree are a dataset size, a word overlap, a geographic distance, a genetic distance, a phonological distance, and the like.

In "Transfer Learning for Collective Link Prediction in Multiple Heterogenous Domains" (ICML 2010), a configuration is disclosed that weighting is performed with a similarity degree between a source domain and a target domain and a prediction from source domain data is added in a case where there is data for the target domain and a plurality of source domains in prediction of an evaluation value of a user item. The domain similarity degree in "Transfer Learning for Collective Link Prediction in Multiple Heterogenous Domains" (ICML 2010) is configured to be trained by using data so as to minimize a prediction error of the target domain.

JP6782802B discloses a configuration in which a similarity degree between a plurality of pre-stored models and patient feature amount data is determined, and a model having a feature amount that is similar to the feature amount data of the target patient is retrieved and used from among the plurality models.

SUMMARY OF THE INVENTION

Yu-Hsiang Lin, Chian-Yu Chen, Jean Lee, Zirui Li, Yuyan Zhang, Mengzhou Xia, Shruti Rijhwani, Junxian He, Zhisong Zhang, Xuezhe Ma, Antonios Anastasopoulos, Patrick Littell, Graham Neubig "Choosing Transfer Languages for Cross-Lingual Learning" (ACL 2019) is not a study of an information suggestion technique but a study related to a translation technique. In the technique described in Yu-Hsiang Lin, Chian-Yu Chen, Jean Lee, Zirui Li, Yuyan Zhang, Mengzhou Xia, Shruti Rijhwani, Junxian He, Zhisong Zhang, Xuezhe Ma, Antonios Anastasopoulos, Patrick Littell, Graham Neubig "Choosing Transfer Languages for Cross-Lingual Learning" (ACL 2019), in a case where there is no language-specific feature amount in estimating a similarity degree, the estimation performance of the similarity degree is decreased.

In the technique disclosed in "Transfer Learning for Collective Link Prediction in Multiple Heterogenous Domains" (ICML 2010), a domain similarity degree cannot be trained without history data of a user behavior or evaluation of the target domain.

Further, both Yu-Hsiang Lin, Chian-Yu Chen, Jean Lee, Zirui Li, Yuyan Zhang, Mengzhou Xia, Shruti Rijhwani, Junxian He, Zhisong Zhang, Xuezhe Ma, Antonios Anastasopoulos, Patrick Littell, Graham Neubig "Choosing Transfer Languages for Cross-Lingual Learning" (ACL 2019) and "Transfer Learning for Collective Link Prediction in Multiple Heterogenous Domains" (ICML 2010) are studies of domain adaptation and do not aim at generalization to an unknown domain.

The technique disclosed in JP6782802B can be applied in the case of a model for each patient but cannot be applied in the case of a model for each facility (domain) as assumed in the information suggestion. Further, even in a case where feature amounts of patients are similar, the prediction performance of the model may not be sufficient due to the difference in domains.

In a case where a learning domain and an introduction destination domain are different from each other, a handling method of selecting an optimal model from among a plurality of models can be considered by training the plurality of models in advance by using datasets collected at a plurality of different facilities as one of a method of realizing robust information suggestion against domain shift and evaluating the performance of these plurality of models by using a dataset including behavior history of a user on an item collected at the introduction destination facility before introduction.

However, in the case of model evaluation before introduction, it is assumed a case where the dataset cannot be prepared at the introduction destination facility, a case where a sufficient amount of data necessary for the model evaluation is not obtained, or the like. In such a case, the performance of the candidate model prepared in advance cannot be evaluated, and a model suitable for the introduction destination facility cannot be selected.

The present disclosure has been made in view of such circumstances, and it is an object of the present disclosure to provide an information processing method, an information processing apparatus, and a program capable of performing an information suggestion by using a model suitable for an introduction destination facility even in a case where the behavior history data of a user on an item at the introduction destination facility cannot be used for the performance evaluation of the model.

An information processing method according to a first aspect of the present disclosure is an information processing method executed by one or more processors, in which a plurality of models, which are trained by using one or more of datasets including a behavior history of a user on an item collected at each of a plurality of first facilities different from each other, are prepared, and the one or more processors comprise: acquiring a characteristic of a second facility, which is different from the plurality of first facilities, and acquiring characteristics of each of the plurality of first facilities; evaluating similarity degrees between the acquired characteristic of the second facility and each of the characteristics of the first facilities where the dataset, which is used for a training of the model, is collected; and selecting a model suitable for the second facility from among the plurality of models based on the similarity degree.

According to the present aspect, each of the plurality of prepared models is a model trained by using one or more datasets among the plurality of datasets collected at the plurality of first facilities. Instead of directly evaluating the performance of each model in the second facility, one or more processors evaluate the similarity degrees between facilities by using the characteristic of the first facility where the dataset used for the training of each model is collected and the characteristic of the second facility. A model, which is trained by using the dataset collected at the first facility having the characteristic similar to that of the second facility as the main dataset in the case of a training, can also show relatively high performance at the second facility. According to the present aspect, even in a case where the behavior history data of a user on an item at the second facility cannot be used, a model suitable for the information suggestion in the second facility can be selected based on the similarity degrees of the characteristics of the facilities.

The facility includes the concept of a group including a plurality of users, for example, a company, a hospital, a store, a government agency, or an EC site. Each of the facilities of the plurality of first facilities and the second facility may be in different domains from each other.

In the information processing method of a second aspect of the present disclosure according to the information processing method of the first aspect, the one or more processors may include extracting statistical information of a dataset of metadata that is an explanatory variable used for the training of the model, and the characteristic may include the statistical information.

In the information processing method of a third aspect of the present disclosure according to the information processing method of the second aspect, the metadata may include at least one of a user attribute or an item attribute.

In the information processing method of a fourth aspect of the present disclosure according to the information processing method of any one of the first to third aspects the one or more processors may include acquiring facility related information other than metadata included in the dataset used for the training of the model, and the characteristic may include the facility related information.

In the information processing method of a fifth aspect of the present disclosure according to the information processing method of the fourth aspect, the facility related information may be extracted by performing web crawling.

In the information processing method of a sixth aspect of the present disclosure according to the information processing method of the fourth or fifth aspect, the one or more processors may be configured to receive the facility related information via a user interface.

In the information processing method of a seventh aspect of the present disclosure according to the information processing method of any one of the first to sixth aspects, the one or more processors may be configured to: acquire an evaluation value of prediction performance at the first facility where the dataset, which is used for the training of each of the plurality of models, is collected; and select a model suitable for the second facility from among the plurality of models based on the similarity degree and the evaluation value of the prediction performance.

In the information processing method of an eighth aspect of the present disclosure according to the information processing method of any one of the first to seventh aspects, the one or more processors may be configured to: acquire conformity evaluation information indicating an evaluation related to conformity of the model with respect to the second facility, separately from the similarity degree; and select a model suitable for the second facility from among the plurality of models based on the similarity degree and the conformity evaluation information.

In the information processing method of a ninth aspect of the present disclosure according to the information processing method of the eighth aspect, the conformity evaluation information may include a result of a questionnaire for a user at the second facility.

In the information processing method of a tenth aspect of the present disclosure according to the information processing method of any one of the first to ninth aspects, the one or more processors may include evaluating, by using characteristics of a plurality of third facilities where similarity degrees between the characteristic of the first facility and each of the characteristics of the plurality of third facilities are evaluated, a similarity degree between the characteristic of the second facility and the characteristic of the first facility based on similarity degrees between the characteristic of the second facility and the characteristics of each of the plurality of third facilities.

In the information processing method of an eleventh aspect of the present disclosure according to the information processing method of the tenth aspect, the one or more processors may include storing, in a storage device, characteristics of the plurality of third facilities, and the similarity degrees between the characteristic of the first facility and each of the characteristics of the plurality of third facilities.

In the information processing method of a twelfth aspect of the present disclosure according to the information processing method of any one of the first to eleventh aspects, the model may be a prediction model used in a suggestion system that suggests an item to a user.

In the information processing method of a thirteenth aspect of the present disclosure according to the information processing method of any one of the first to twelfth aspects, the one or more processors may include storing the plurality of models in a storage device.

In the information processing method of a fourteenth aspect of the present disclosure according to the information processing method of the thirteenth aspect, the one or more processors may include storing the characteristic of the first facility where the dataset, which is used for the training of each of the model, is collected in the storage device in association with the model.

An information processing apparatus according to a fifteenth aspect of the present disclosure comprises: one or more processors; and one or more storage devices, in which an instruction executed by the one or more processors is stored, in which a plurality of models, which are trained by using one or more of datasets including a behavior history of a user on an item collected at each of facilities of a plurality of first facilities different from each other, are stored in the storage device, and the one or more processors are configured to: acquire a characteristic of a second facility, which is different from the plurality of first facilities, and acquire characteristics of each of the plurality of first facilities; evaluate similarity degrees between the acquired characteristic of the second facility and each of the characteristics of the first facilities where a main dataset, which is used for a training of the model, is collected; and select a model suitable for the second facility from among the plurality of models based on the similarity degree.

The information processing apparatus according to the fifteenth aspect can include the same specific aspect as the information processing method according to any one of the second to fourteenth aspects described above.

A program according to a sixteenth aspect of the present disclosure causes a computer to realize: a function of storing a plurality of models, which are trained by using one or more of datasets including a behavior history of a user on an item collected at each of facilities of a plurality of first facilities different from each other; a function of acquiring a characteristic of a second facility, which is different from the plurality of first facilities, and acquiring characteristics of each of the plurality of first facilities; a function of evaluating similarity degrees between the acquired characteristic of the second facility and each of the characteristics of the first facilities where the dataset, which is used for a training of the model, is collected; and a function of selecting a model suitable for the second facility from among the plurality of models based on the similarity degree.

The program according to the sixteenth aspect can include the same specific aspect as the information processing method according to any one of the second to fourteenth aspects described above.

According to the present disclosure, even in a case where the behavior history data of a user on an item at the second facility, different from the first facility where the dataset used for the training of the model is collected, cannot be used for the performance evaluation of the model, a model suitable for the second facility can be selected from among the plurality of models. Accordingly, an appropriate information suggestion can be made at the second facility by using the selected model.

DESCRIPTION OF THE PREFERRED EMBODIMENTS

Hereinafter, preferred embodiments of the present invention will be described with reference to the accompanying drawings.

Overview of Information Suggestion Technique

First, the outline and problems of an information suggestion technique will be overviewed by showing specific examples. The information suggestion technique is a technique for suggesting an item to a user.

Figure 1:
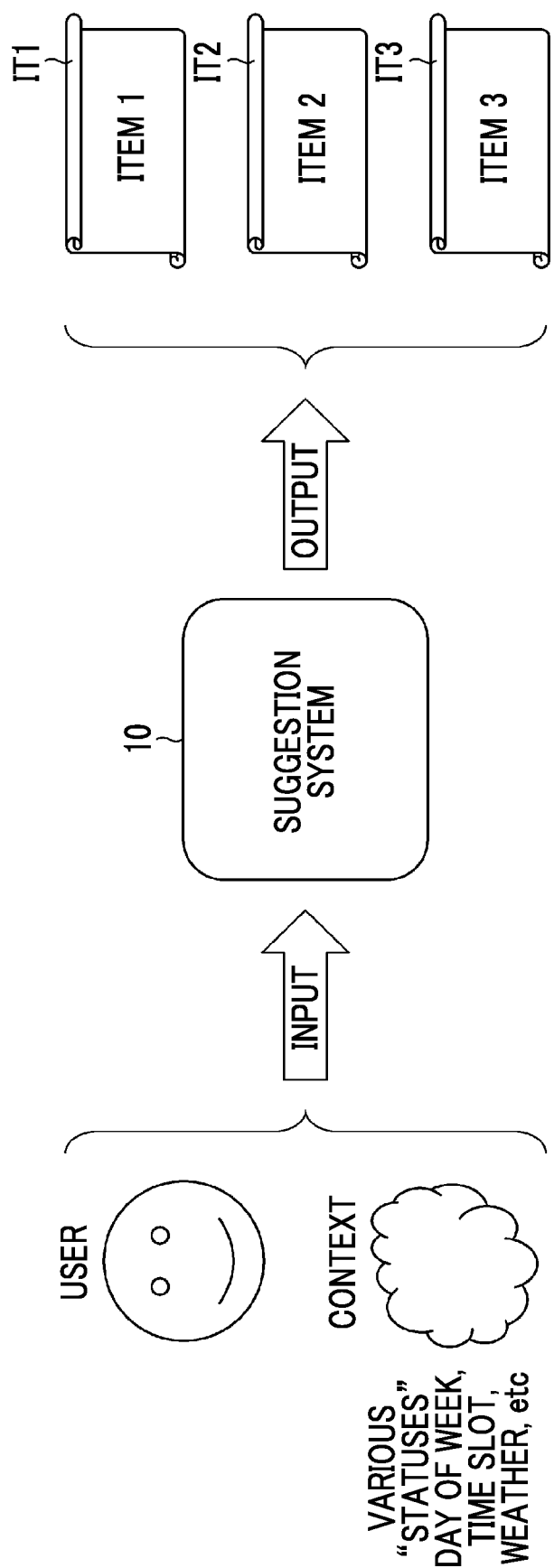
FIG. 1 is a conceptual diagram of a typical suggestion system.

FIG. 1 is a conceptual diagram of a typical suggestion system 10. The suggestion system 10 receives user information and context information as inputs and outputs information of the item that is suggested to the user according to a context. The context means various "statuses" and may be, for example, a day of the week, a time slot, or the weather. The items may be various objects such as a book, a video, a restaurant, and the like.

The suggestion system 10 generally suggests a plurality of items at the same time. FIG. 1 shows an example in which the suggestion system 10 suggests three items of IT1, IT2, and IT3. In a case where the user responds positively to the suggested items IT1, IT2, and IT3, the suggestion is generally considered to be successful. A positive response is, for example, a purchase, browsing, or visit. Such a suggestion technique is widely used, for example, in an EC site, a gourmet site that introduces a restaurant, or the like.

Figure 2:
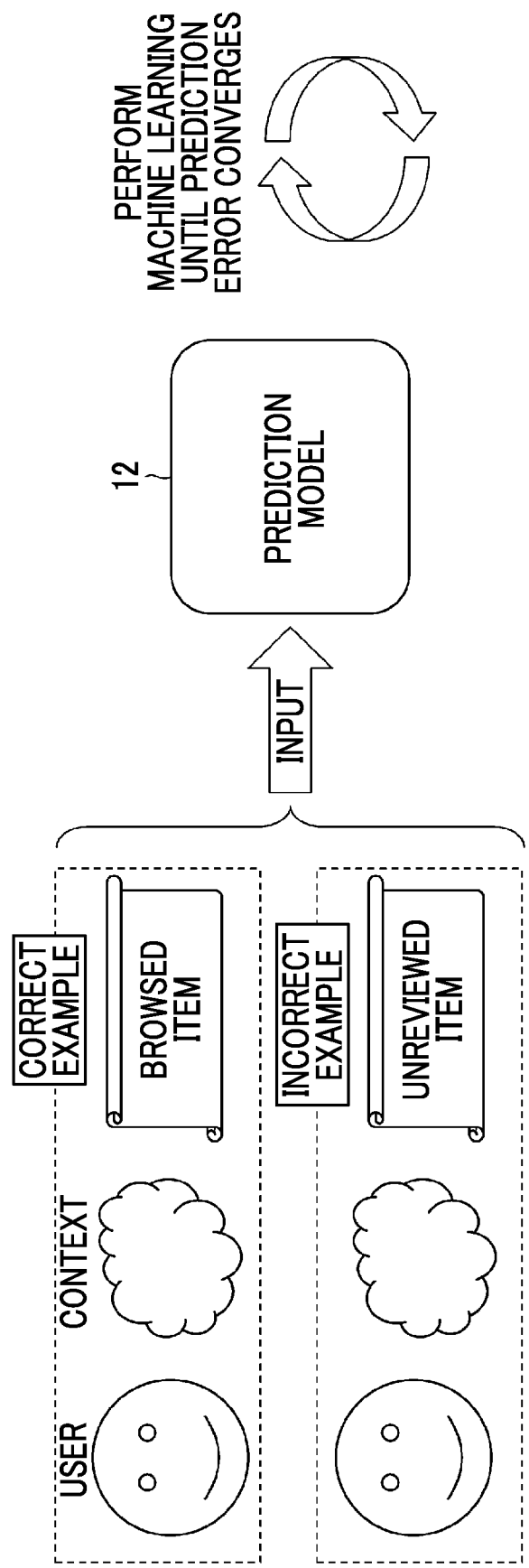
FIG. 2 is a conceptual diagram showing an example of machine learning with a teacher that is widely used in building a suggestion system.

The suggestion system 10 is built by using a machine learning technique. FIG. 2 is a conceptual diagram showing an example of machine learning with a teacher that is widely used in building the suggestion system 10. Generally, a positive example and a negative example are prepared based on a user behavior history in the past, a combination of the user and the context is input to a prediction model 12, and the prediction model 12 is trained such that a prediction error becomes small. For example, a browsed item that is browsed by the user is defined as a positive example, and a nonbrowsed item that is not browsed by the user is defined as a negative example. The machine learning is performed until the prediction error converges, and the target prediction performance is acquired.

By using the trained prediction model 12, which is trained in this way, items with a high browsing probability, which is predicted with respect to the combination of the user and the context, are suggested. For example, in a case where a combination of a certain user A and a context β is input to the trained prediction model 12, the prediction model 12 infers that the user A has a high probability of browsing a document such as the item IT3 under a condition of the context β and suggests an item similar to the item IT3 to the user A. Depending on the configuration of the suggestion system 10, items are often suggested to the user without considering the context.

Example of Data Used for Developing Suggestion System

The user behavior history is substantially equivalent to "correct answer data" in machine learning. Strictly speaking, it is understood as a task setting of inferring the next (unknown) behavior from the past behavior history, but it is general to train the potential feature amount based on the past behavior history.

The user behavior history may include, for example, a book purchase history, a video browsing history, or a restaurant visit history.

Further, main feature amounts include a user attribute and an item attribute. The user attribute may have various elements such as, for example, gender, age group, occupation, family structure, and residential area. The item attribute may have various elements such as a book genre, a price, a video genre, a length, a restaurant genre, and a place.

Model Building and Operation

Figure 3:
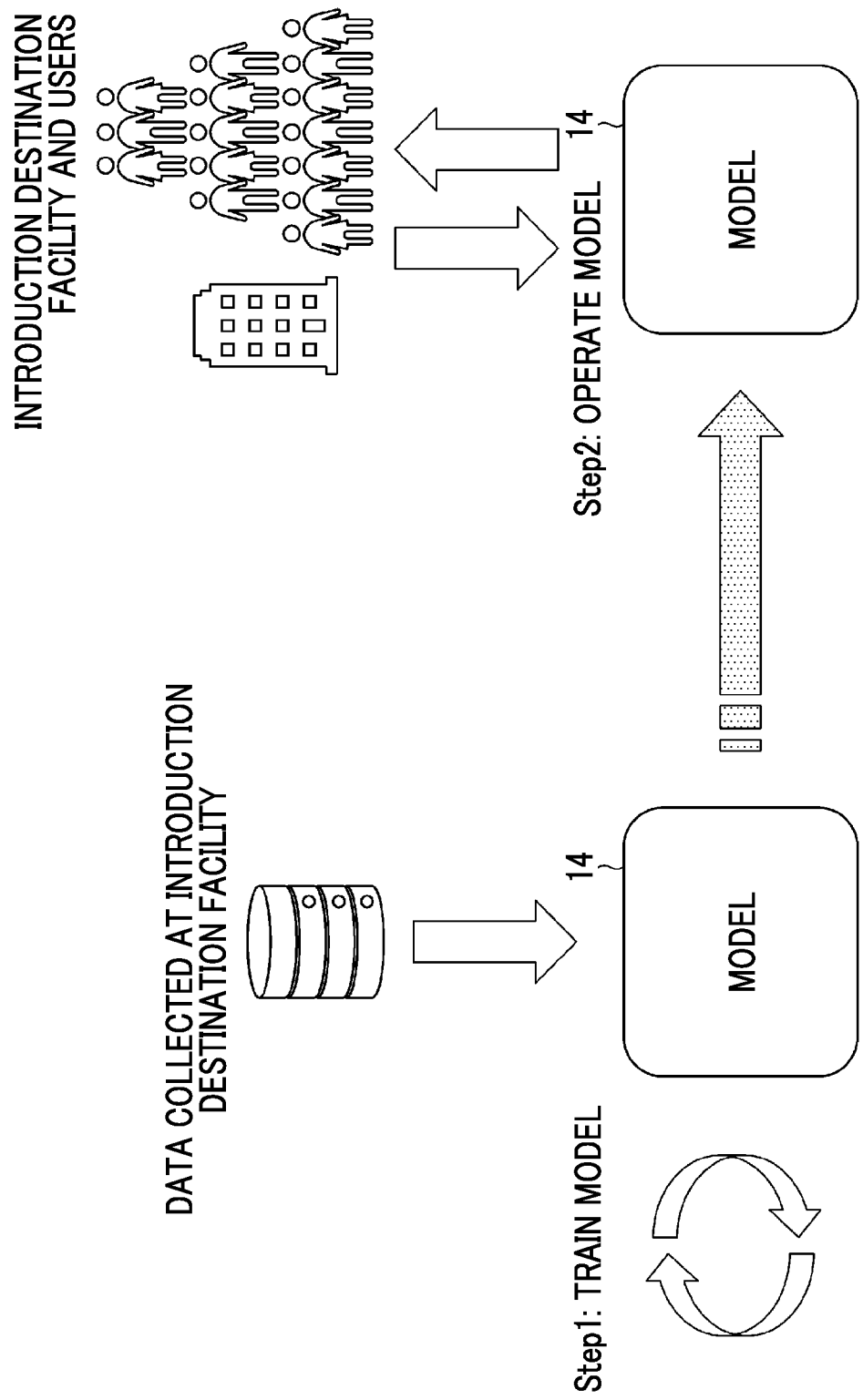
FIG. 3 is an explanatory diagram showing a typical introduction flow of the suggestion system.

FIG. 3 is an explanatory diagram showing a typical introduction flow of the suggestion system. Here, a typical flow in a case where the suggestion system is introduced to a certain facility, is shown. To introduce the suggestion system, first, a model 14 for performing a target suggestion task is built (step 1), and then the built model 14 is introduced and operated (step 2). In the case of a machine learning model, "Building" the model 14 includes training the model 14 by using training data to create a prediction model (suggestion model) that satisfies a practical level of suggestion performance. "Operating" the model 14 is, for example, obtaining an output of a suggested item list from the trained model 14 with respect to the input of the combination of the user and the context.

Data for a training is required for building the model 14. As shown in FIG. 3, in general, the model 14 of the suggestion system is trained based on the data collected at an introduction destination facility. By performing training by using the data collected from the introduction destination facility, the model 14 learns the behavior of the user in the introduction destination facility and can accurately predict suggestion items for the user in the introduction destination facility.

However, due to various circumstances, it may not be possible to obtain data on the introduction destination facility. For example, in the case of a document information suggestion system in an in-house system of a company or an in-hospital system of a hospital, a company that develops a suggestion model often cannot access the data of the introduction destination facility. In a case where the data of the introduction destination facility cannot be obtained, instead, it is necessary to perform training based on data collected at different facilities.

Figure 4:
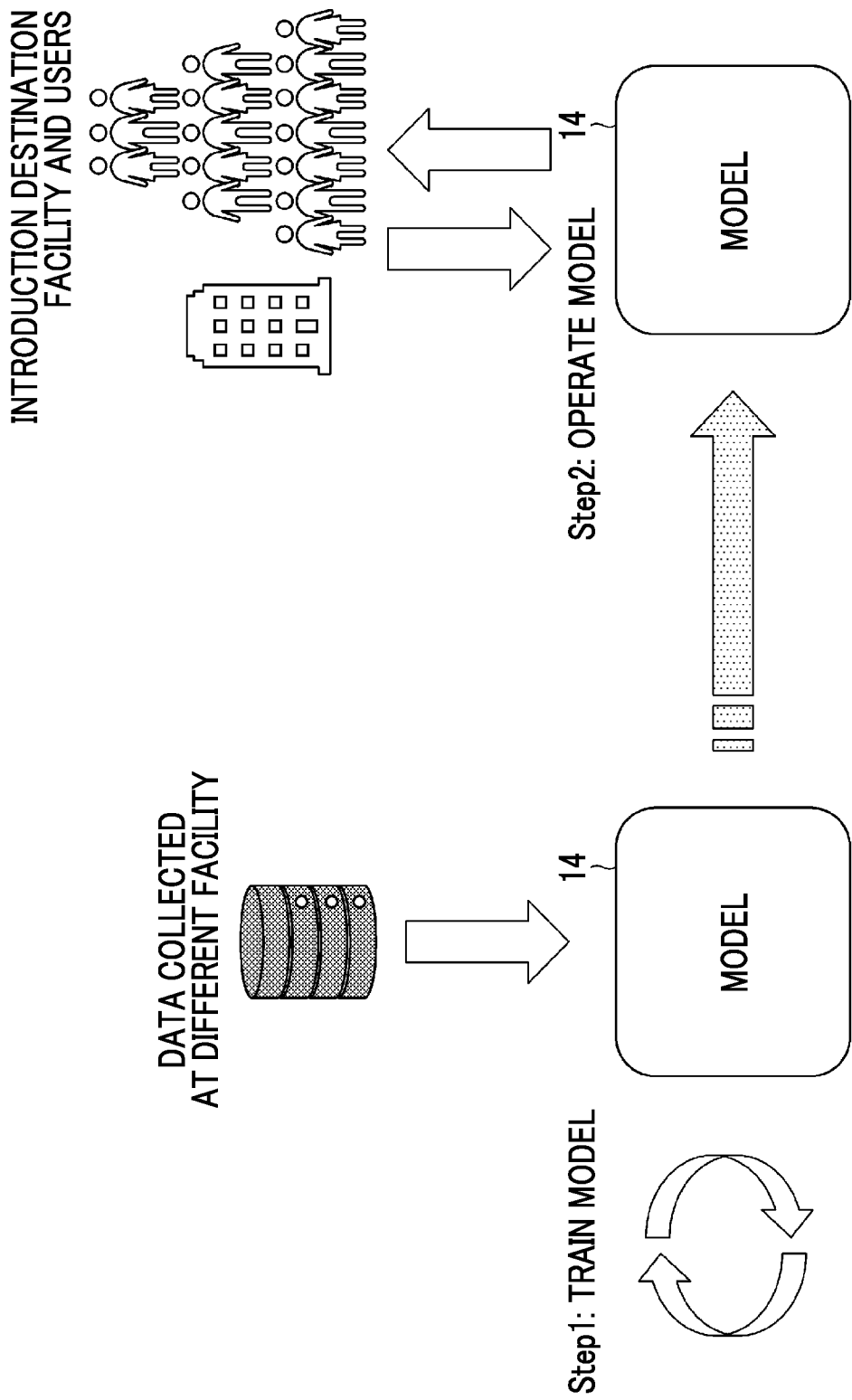
FIG. 4 is an explanatory diagram of an introduction flow of the suggestion system in a case where data of an introduction destination facility cannot be obtained.

FIG. 4 is an explanatory diagram of an introduction flow of the suggestion system in a case where data of an introduction destination facility cannot be obtained. In a case where the model 14, which is trained by using the data collected in a facility different from the introduction destination facility, is operated in the introduction destination facility, there is a problem that the prediction accuracy of the model 14 decreases due to differences in user behavior between facilities.

The problem that the machine learning model does not work well in unknown facilities different from the trained facility is understood as a technical problem, in a broad sense, to improve robustness against a problem of domain shift in which a source domain where the model 14 is trained differs from a target domain where the model 14 is applied. Domain adaptation is a problem setting related to domain generalization. This is a method of training by using data from both the source domain and the target domain. The purpose of using the data of different domains in spite of the presence of the data of the target domain is to make up for the fact that the amount of data of the target domain is small and insufficient for a training.

Figure 5:
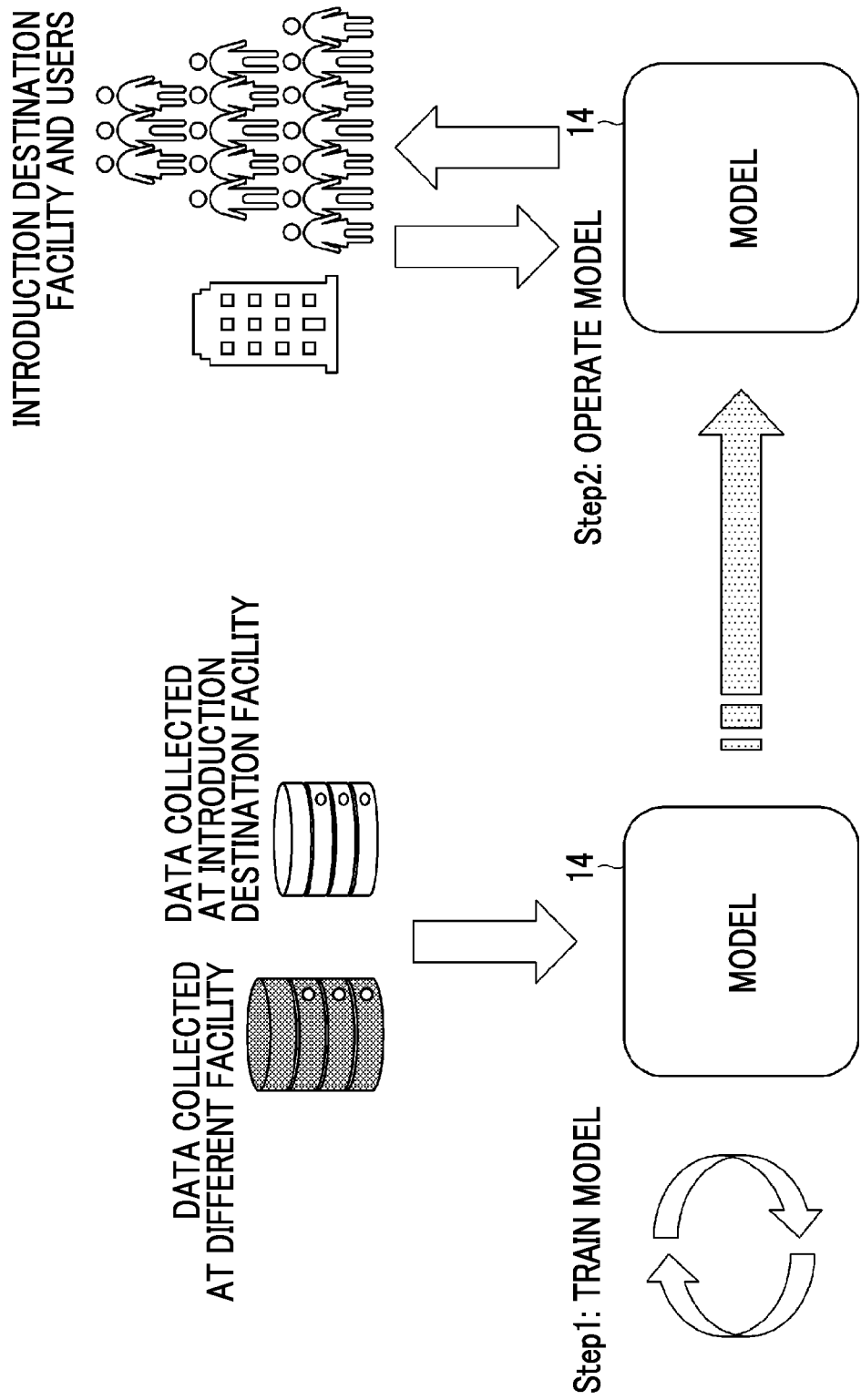
FIG. 5 is an explanatory diagram in a case where a model is trained by domain adaptation.

FIG. 5 is an explanatory diagram in a case where the model 14 is trained by domain adaptation. Although the amount of data collected at the introduction destination facility that is the target domain is relatively smaller than the data collected at a different facility, the model 14 can also predict with a certain degree of accuracy the behavior of the users in the introduction destination facility by performing a training by using both data.

Description of Domain

The above-mentioned difference in a "facility" is a kind of difference in a domain. In Ivan Cantador et al, Chapter 27:"Cross-domain Recommender System", which is a document related to research on domain adaptation in information suggestion, differences in domains are classified into the following four categories.

[1] Item attribute level: For example, a comedy movie and a horror movie are in different domains.
[2] Item type level: For example, a movie and a TV drama series are in different domains.
[3] Item level: For example, a movie and a book are in different domains.
[4] System level: For example, a movie in a movie theater and a movie broadcast on television are in different domains.

The difference in "facility" shown in FIG. 5 or the like corresponds to [4] system-level domain in the above four categories.

In a case where a domain is formally defined, the domain is defined by a simultaneous probability distribution $P(X, Y)$ of a response variable Y and an explanatory variable X, and in a case where $Pd1(X, Y) \neq Pd2(X, Y)$, d1 and d2 are different domains.

The simultaneous probability distribution $P(X, Y)$ can be represented by a product of an explanatory variable distribution $P(X)$ and a conditional probability distribution $P(Y|X)$ or a product of a response variable distribution $P(Y)$ and a conditional probability distribution $P(X|Y)$.

$$P(X,Y)=P(Y|X)P(X)=P(X|Y)P(Y)$$

Therefore, in a case where one or more of $P(X)$, $P(Y)$, $P(Y|X)$, and $P(X|Y)$ is changed, the domains become different from each other.

Typical Pattern of Domain Shift

Covariate Shift A case where distributions $P(X)$ of explanatory variables are different is called a covariate shift. For example, a case where distributions of user attributes are different between datasets, more specifically, a case where a gender ratio is different, and the like correspond to the covariate shift.

Prior Probability Shift

A case where distributions $P(Y)$ of the response variables are different is called a prior probability shift. For example, a case where an average browsing ratio or an average purchase ratio differs between datasets corresponds to the prior probability shift.

Concept Shift

A case where conditional probability distributions $P(Y|X)$ and $P(X|Y)$ are different is called a concept shift. For example, a probability that a research and development department of a certain company reads data analysis materials is assumed as $P(Y|X)$, and in a case where the probability differs between datasets, this case corresponds to the concept shift.

Research on domain adaptation or domain generalization includes assuming one of the above-mentioned patterns as a main factor and looking at dealing with $P(X, Y)$ changing without specifically considering which pattern is a main factor. In the former case, there are many cases in which a covariate shift is assumed.

Reason for Influence of Domain Shift

A prediction/classification model that performs a prediction or classification task makes inferences based on a relationship between the explanatory variable X and the response variable, thereby in a case where $P(Y|X)$ is changed, naturally the prediction/classification performance is decreased. Further, although minimization of a prediction/classification error is performed within learning data in a case where machine learning is performed on the prediction/classification model, for example, in a case where the frequency in which the explanatory variable becomes $X=X\_1$ is greater than the frequency in which the explanatory variable becomes $X=X\_2$, that is, in a case where $P(X=X\_1) > P(X=X\_2)$, the data of $X=X\_1$ is more than the data of $X=X\_2$, thereby error decrease for $X=X\_1$ is trained in preference to error decrease for $X=X\_2$. Therefore, even in a case where $P(X)$ is changed between the facilities, the prediction/classification performance is decreased.

The domain shift can be a problem not only for information suggestion but also for various task models. For example, regarding a model that predicts the retirement risk of an employee, a domain shift may become a problem in a case where a prediction model, which is trained by using data of a certain company, is operated by another company.

Further, in a model that predicts an antibody production amount of a cell, a domain shift may become a problem in a case where a model, which is trained by using data of a certain antibody, is used for another antibody. Further, for a model that classifies the voice of customer (VOC), for example, a model that classifies VOC into "product function", "support handling", and "other", a domain shift may be a problem in a case where a classification model, which is trained by using data related to a certain product, is used for another product.

Evaluation Before Introduction of Model

In many cases, a performance evaluation is performed on the model 14 before the trained model 14 is introduced into an actual facility or the like. The performance evaluation is necessary for determining whether or not to introduce the model and for research and development of models or learning methods.

Figure 6:
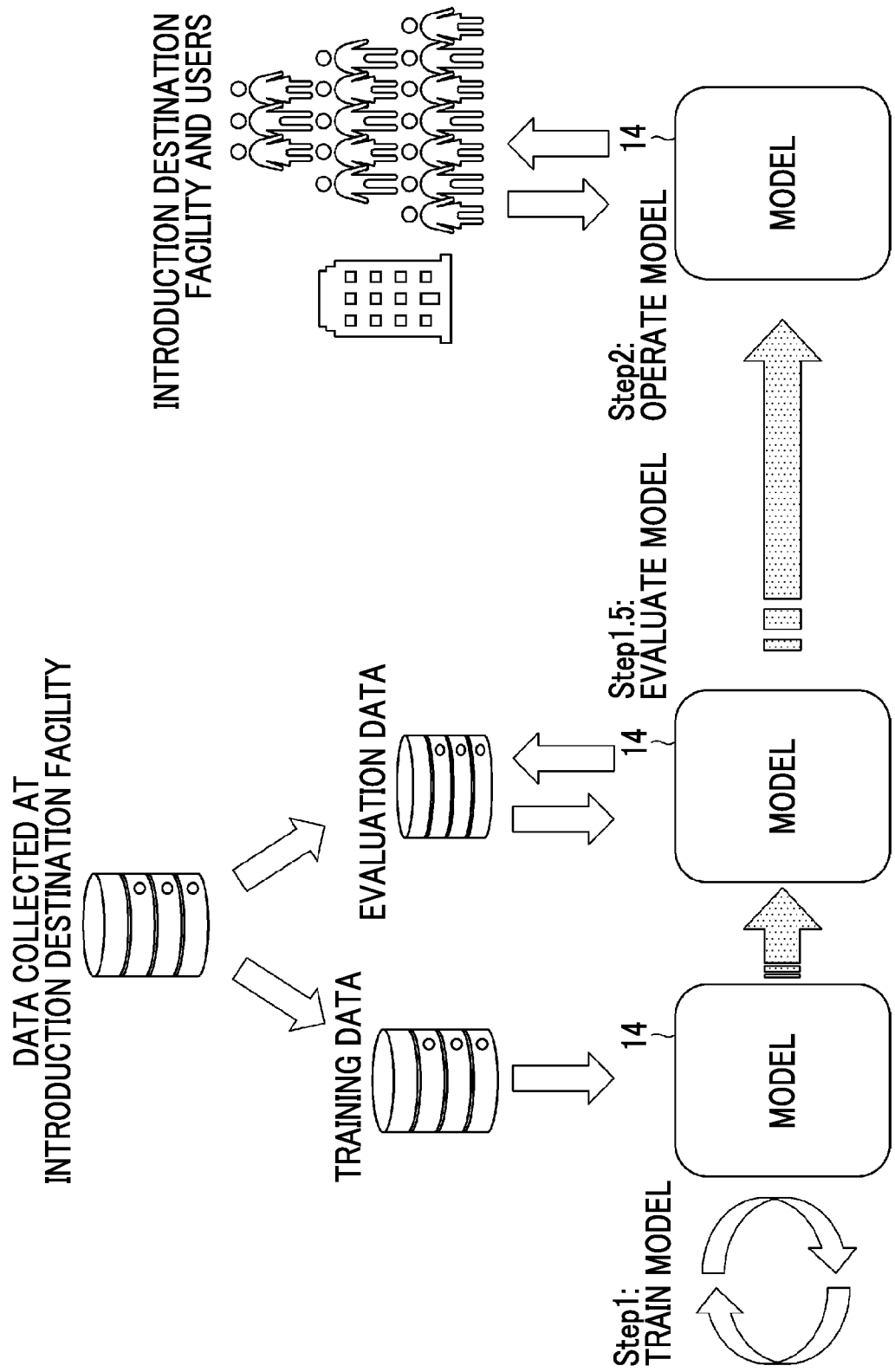
FIG. 6 is an explanatory diagram of an introduction flow of the suggestion system including a step of evaluating the performance of the trained model.

FIG. 6 is an explanatory diagram of an introduction flow of the suggestion system including a step of evaluating the performance of the trained model 14. In FIG. 6, a step of evaluating the performance of the model 14 is added as "step 1.5" between step 1 (the step of training the model 14) and step 2 (the step of operating the model 14) described in FIG. 5. Other configurations are the same as in FIG. 5. As shown in FIG. 6, in a general introduction flow of the suggestion system, the data, which is collected at the introduction destination facility, is often divided into training data and evaluation data. The prediction performance of the model 14 is checked by using the evaluation data, and then the operation of the model 14 is started.

However, in a case of building the model 14 of domain generalization, the training data and the evaluation data need to be different domains. Further, in the domain generalization, it is preferable to use the data of a plurality of domains as the training data, and it is more preferable that there are many domains that can be used for a training.

Regarding Generalization

Figure 7:
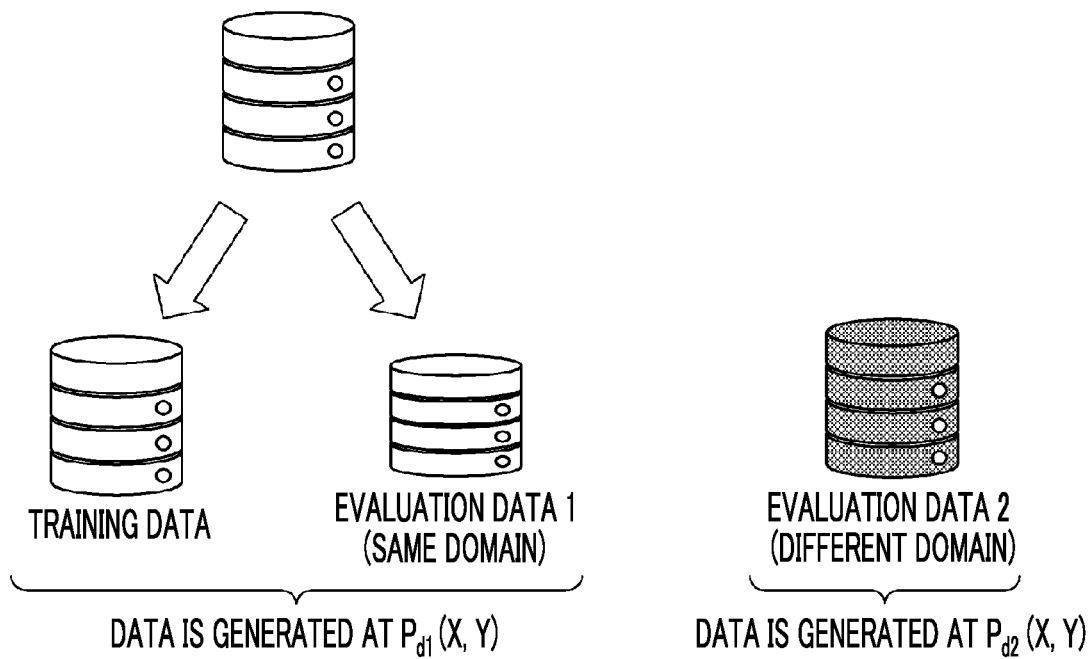
FIG. 7 is an explanatory diagram showing an example of training data and evaluation data used for the machine learning.

FIG. 7 is an explanatory diagram showing an example of the training data and the evaluation data used for the machine learning. The dataset obtained from the simultaneous probability distribution Pd1(X, Y) of a certain domain d1 is divided into training data and evaluation data. The evaluation data of the same domain as the training data is referred to as "first evaluation data" and is referred to as "evaluation data 1" in FIG. 7. Further, a dataset, which is obtained from a simultaneous probability distribution Pd2 (X, Y) of a domain d2 different from the domain d1, is prepared and is used as the evaluation data. The evaluation data of the domain different from the training data is referred to as "second evaluation data" and is referred to as "evaluation data 2" in FIG. 7.

The model 14 is trained by using the training data of the domain d1, and the performance of the model 14, which is trained by using each of the first evaluation data of the domain d1 and the second evaluation data of the domain d2, is evaluated.

Figure 8:
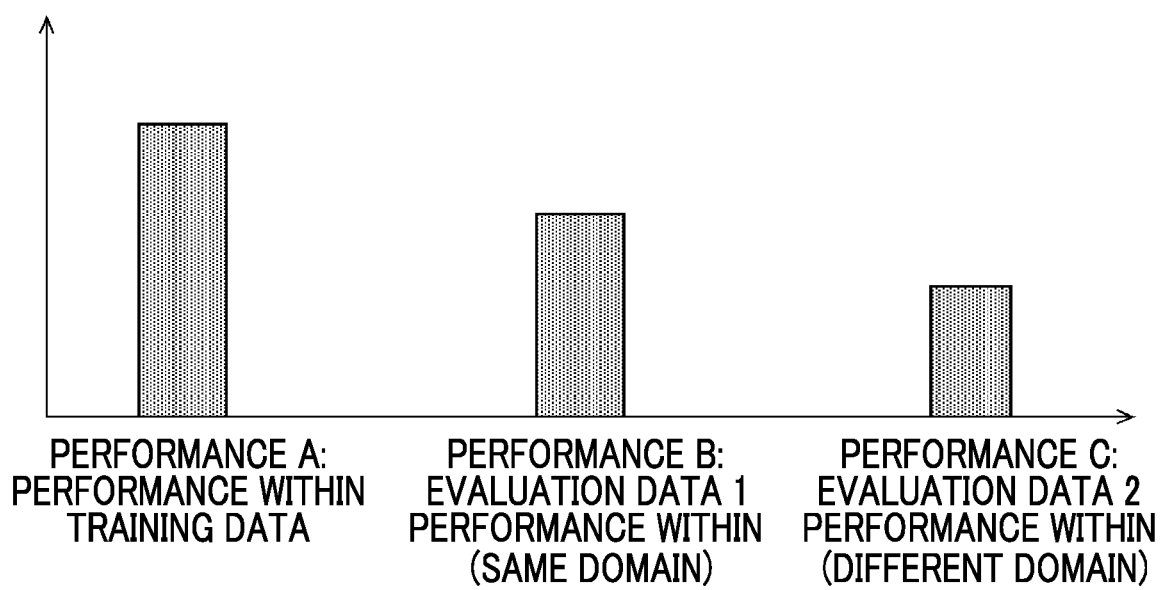
FIG. 8 is a graph schematically showing a difference in performance of a model due to a difference in a dataset.

FIG. 8 is a graph schematically showing a difference in performance of the model due to a difference in the dataset. Assuming that the performance of the model 14 in the training data is defined as performance A, the performance of the model 14 in the first evaluation data is defined as performance B, and the performance of the model 14 in the second evaluation data is defined as performance C, normally, a relationship is represented such that performance A>performance B>performance C, as shown in FIG. 8.

High generalization performance of the model 14 generally indicates that the performance B is high, or indicates that a difference between the performances A and B is small. That is, the aim is to achieve high prediction performance even for untrained data without over-fitting to the training data.

In the context of domain generalization in the present specification, it means that the performance C is high or a difference between the performance B and the performance C is small. In other words, the aim is to achieve high performance consistently even in a domain different from the domain used for the training.

Even in a case where it is not possible to use the behavior history data of the introduction destination facility in the case of a training, in a case where the data can be prepared before the introduction, by training a plurality of models by using the data collected at a facility different from the introduction destination facility and by evaluating the performance of these plurality of model before the introduction by using the data collected at the introduction destination facility, it is conceivable to select the optimal model from among the plurality of models and apply the optimal model to the introduction destination facility based on the results of the evaluation. An example thereof is shown in FIG. 9.

Figure 9:
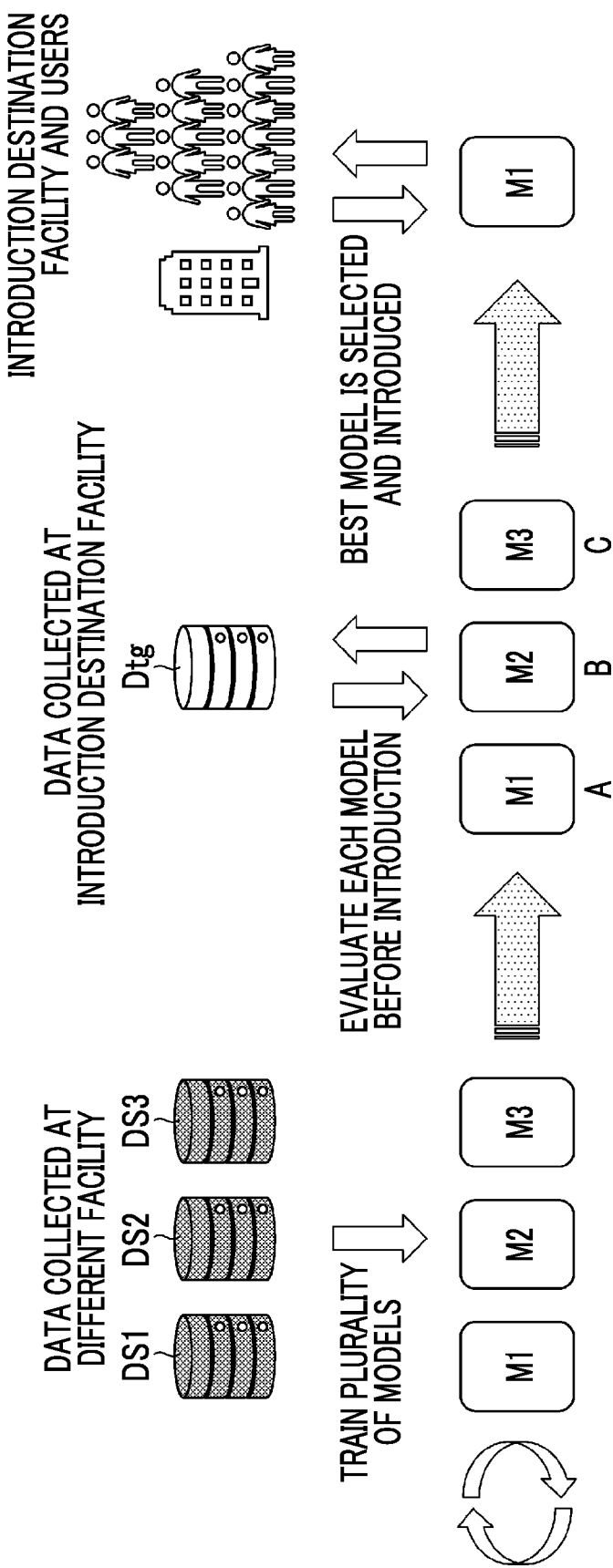
FIG. 9 is an explanatory diagram showing an example of an introduction flow of the suggestion system in a case where a learning domain and an introduction destination domain are different from each other.

FIG. 9 is an explanatory diagram showing an example of an introduction flow of the suggestion system in a case where a learning domain and an introduction destination domain are different from each other. As shown in FIG. 9, a plurality of models can be trained by using the data collected at a facility different from the introduction destination facility. Here, an example is shown in which training of models M1, M2, and M3 is performed by using datasets DS1, DS2, and DS3 collected at different facilities. For example, the model M1 is trained by using the dataset DS1, the model M2 is trained by using the dataset DS2, and the model M3 is trained by using the dataset DS3. The dataset used for training each of the models M1, M2, and M3 may be a combination of a plurality of datasets collected at different facilities. For example, the model M1 may be trained by using a dataset in which the dataset DS1 and the dataset DS2 are mixed.

In this way, after the plurality of models M1, M2, and M3 are trained, the performance of each of the models M1, M2, and M3 is evaluated by using data Dtg collected at the introduction destination facility. In FIG. 9, the symbols "A", "B", and "C" shown below the respective models M1, M2, and M3 represent the evaluation results of the respective models. The evaluation A indicates that the prediction performance satisfies an introduction standard. The evaluation B indicates that the performance is inferior to the evaluation A. The evaluation C is a performance inferior to the evaluation B and indicates that the performance is not suitable for introduction.

For example, as shown in FIG. 9, assuming that the evaluation result of the model M1 is defined as "A", the evaluation result of the model M2 is defined as "B", and the evaluation result of model M3 is defined as "C", the model M1 is selected as the most optimal model at the introduction destination facility, and the suggestion system 10 to which the model M1 is applied is introduced.

Description of Problem

In the present embodiment, it is assumed a case where behavior history data of a user on an item at the introduction destination facility cannot be prepared either at the time of a model learning or at the time of evaluation before introduction, or a case where the amount of data is small and a sufficient amount of data is not prepared for the model evaluation even in a case data is present.

Figure 10:
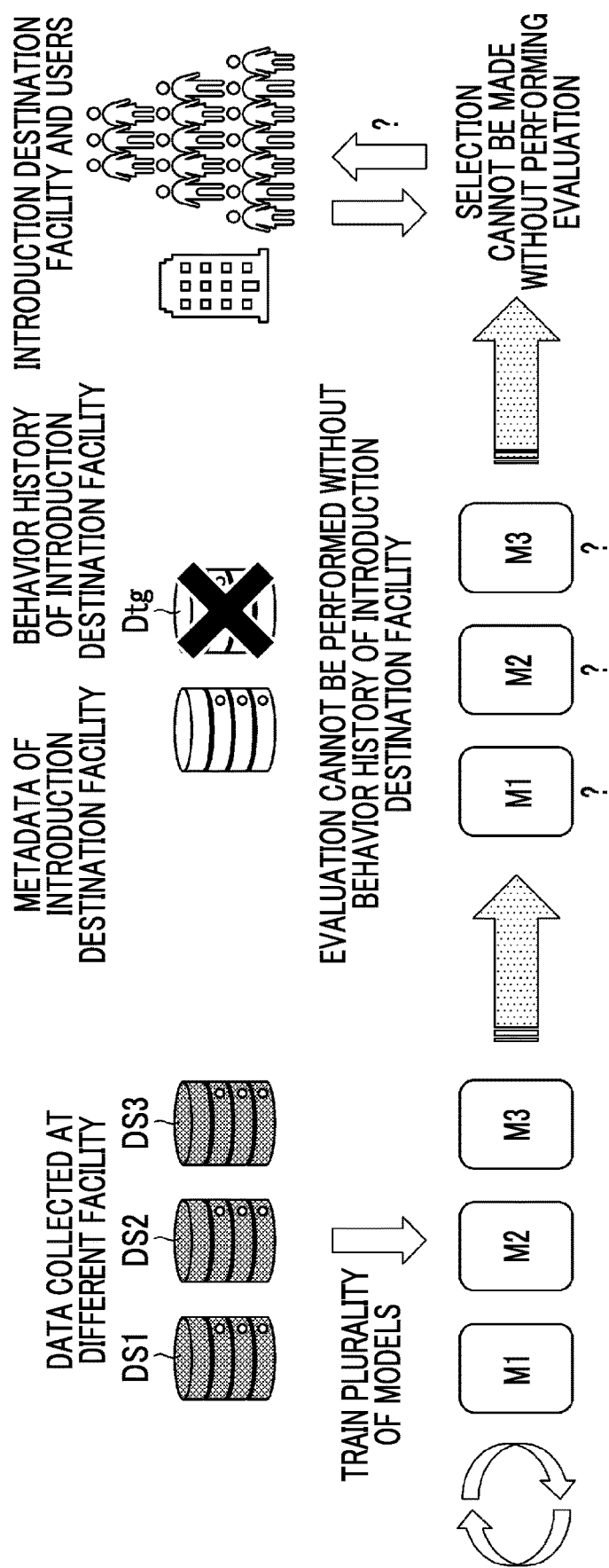
FIG. 10 is an explanatory diagram showing a problem in a case where a user behavior history in an introduction destination facility is not present.

FIG. 10 is an explanatory diagram showing a problem in a case where a user behavior history in an introduction destination facility is not present. The data, which is used in the information suggestion is roughly classified into a user behavior history and metadata such as a user attribute and an item attribute. The user behavior history is a response variable, and metadata such as a user attribute or an item attribute is an explanatory variable.

It is not possible to evaluate the performance of a model without behavior history data of users in the introduction destination facility. That is, since the model, which is used in the information suggestion system, predicts the response variable based on the explanatory variable, the prediction accuracy of the model cannot be evaluated without correct answer data of the response variable. Unless the performance of the model can be evaluated, it is difficult to select a model suitable for the introduction destination facility from among the plurality of models. Such a problem is the same in a case where the amount of data is small and a sufficient amount of data is not prepared for the model evaluation even in a case where a user behavior history at the introduction destination facility is present.

In the present embodiment, even in a case where the behavior history data in the introduction destination facility is not present or even in a case where the amount of data required for model evaluation is insufficient, a method is provided that is capable of selecting a high performance model at the introduction destination facility from among the plurality of models. In the following description, an introduction destination facility of the suggestion system 10 is referred to as an "introduction destination facility", and a facility where data for training the candidate model is collected is referred to as a "learning facility". The introduction destination facility corresponds to a target domain, and the learning facility corresponds to a learning domain.

Outline of Information Processing Method According to First Embodiment

Figure 11:
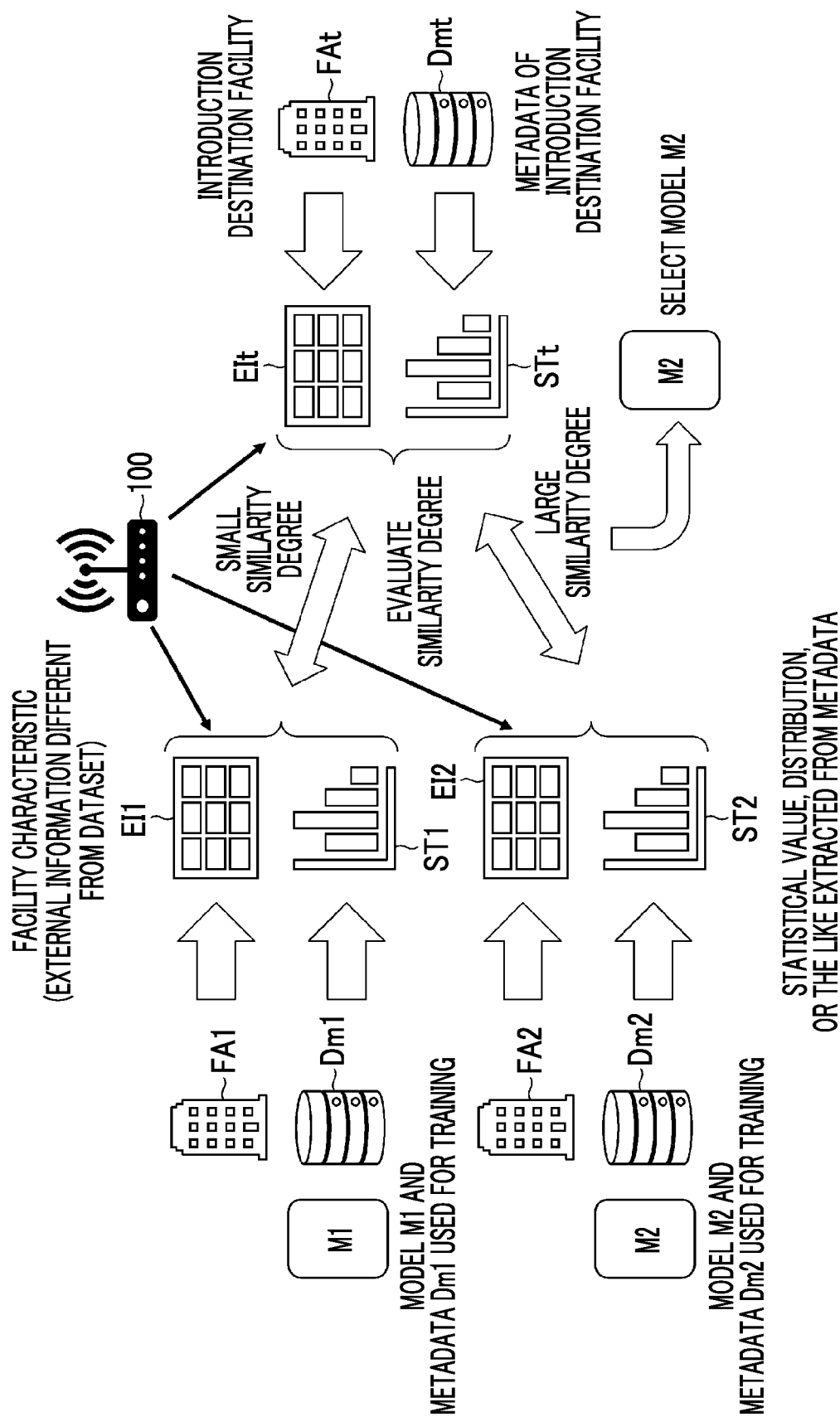
FIG. 11 is an explanatory diagram showing an outline of an information processing method according to a first embodiment.
Figure 12:
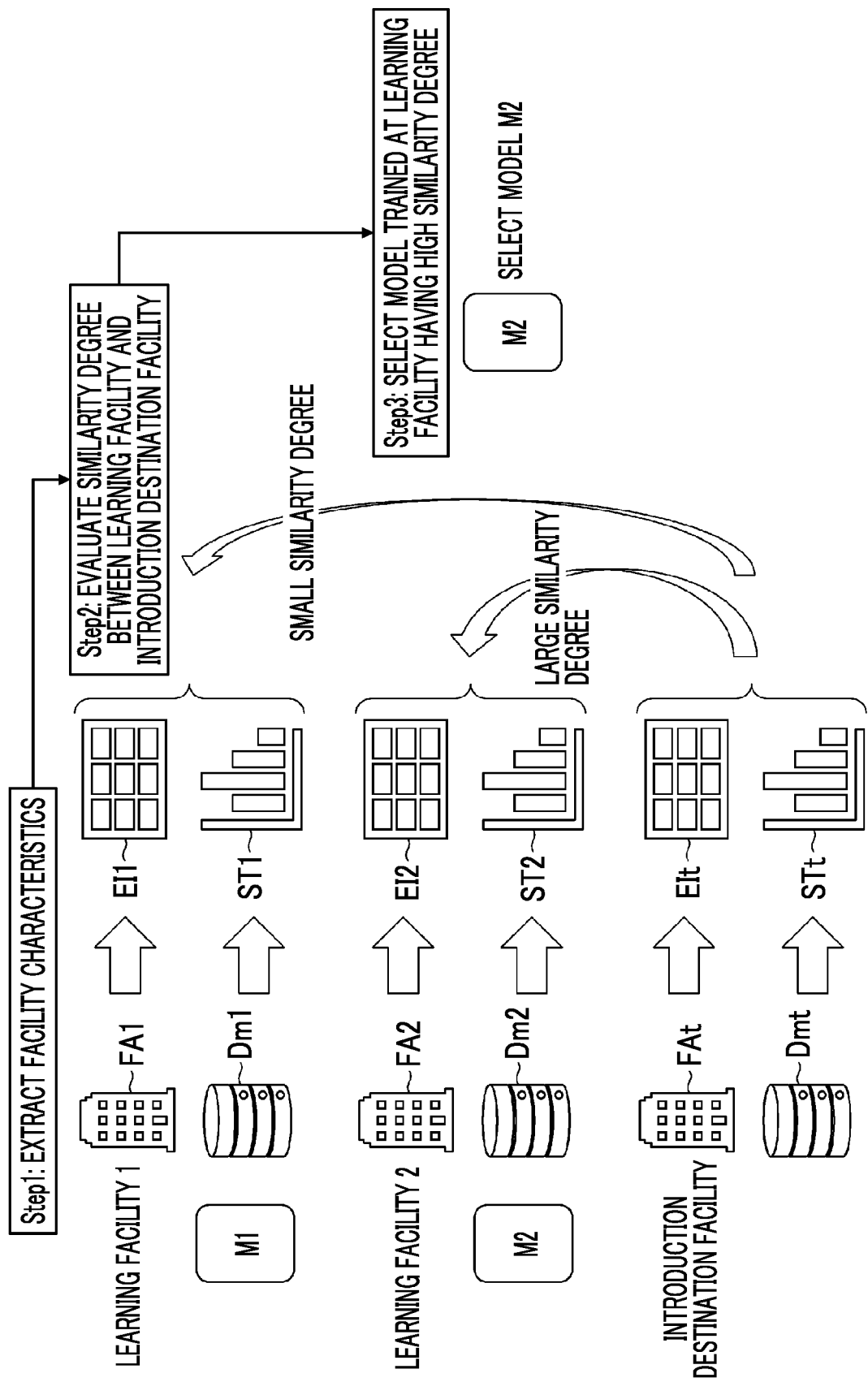
FIG. 12 is an explanatory diagram showing an example of a process executed by an information processing apparatus according to the embodiment.

FIG. 11 and FIG. 12 are explanatory diagrams showing an outline of an information processing method according to a first embodiment. Here, although an example will be described in which a model M1 and a model M2 are prepared in advance as candidate models, in reality, a larger number of models may be prepared.

The candidate model M1 is a prediction model trained by using data collected in a learning facility FA1 different from an introduction destination facility FAt. Similarly, the other candidate model M2 is a prediction model trained by using data collected in a learning facility FA2 different from the introduction destination facility FAt and the learning facility FA1.

It is assumed that a user behavior history at the introduction destination facility FAt cannot be used. The "cannot be used" includes concepts such as a case where a behavior history is not present, a case where data cannot be accessed even in a case where data is present, or a case where the amount of data is small and the amount of data required for model evaluation is insufficient. On the other hand, it is assumed that a dataset Dmt of metadata such as a user attribute and/or an item attribute is present for the introduction destination facility FAt shown in FIG. 11.

In this case, the information processing apparatus 100 according to the present embodiment performs processes according to the following procedure (steps 1 to 3).

Step 1

In step 1, the information processing apparatus 100 extracts information indicating the characteristics of each of the facilities of the learning facilities FA1 and FA2, and the introduction destination facility FAt. The information indicating the characteristics of the learning facilities FA1 and FA2 may be statistical values or distributions extracted from the datasets Dm1 and Dm2 of the metadata (explanatory variables) used for a training by using a statistical process or the like.

Facility characteristic information such as the statistical information extracted from the metadata of the explanatory variable is referred to as "metadata-derived facility characteristic information". In a case where the explanatory variables are continuous values, the statistical information as the metadata-derived facility characteristic information may be, for example, a statistical value such as an average value or a standard deviation, or a combination thereof. Further, in a case where the explanatory variables are discrete values, the statistical information as the metadata-derived facility characteristic information may be, for example, the most frequent value, a probability distribution, or a combination thereof.

Further, information indicating the characteristics of the facilities of the learning facilities FA1 and FA2 may be external information different from the dataset used for the training. The external information may be, for example, information collected from the Internet by performing web crawling, or a statistical value or a distribution extracted from the collected information. Further, the external information may be information that is input via a user interface based on available publicly known materials or the like.

That is, a method, in which the information processing apparatus 100 acquires information related to a facility from datasets other than datasets collected at each facility, includes a case where an algorithm of the information processing apparatus 100 or other system automatically collects and/or automatically extracts information by performing web crawling or the like, and a case where an operator researches and/or inputs publicly known material or the like.

The external information other than such a dataset is facility characteristic information that cannot be extracted from the metadata included in the dataset. The facility characteristic information that cannot be extracted from the metadata is called "facility related information other-than-metadata".

The facility characteristic information acquired by the information processing apparatus 100 for each facility may include both the metadata-derived facility characteristic information and the facility related information other-than-metadata, or may be information on only one of these. It is assumed that the dataset Dmt of the explanatory variable (metadata) such as the user attribute and the item attribute is prepared for the introduction destination facility FAt shown in FIG. 11.

The information processing apparatus 100 acquires metadata-derived facility characteristic information ST1 and the facility related information other-than-metadata EI1 for the learning facility FA1 as the facility characteristic information of the learning facility FA1. Further, the information processing apparatus 100 acquires metadata-derived facility characteristic information ST2 and the facility related information other-than-metadata EI2 for the learning facility FA2 as the facility characteristic information of the learning facility FA2.

Similarly, the information processing apparatus 100 acquires metadata-derived facility characteristic information STt such as a statistical value and a distribution extracted from the dataset Dmt of the metadata collected from the introduction destination facility FAt, and facility related information other-than-metadata EIt obtained by performing web crawling or the like.

Step 2

In step 2, the information processing apparatus 100 evaluates a similarity degree between each of the learning facilities FA1 and FA2 and the introduction destination facility FAt based on the acquired facility characteristic information of each facility. For example, the facility characteristic information of each facility is represented as a multidimensional vector, and the similarity degree is evaluated by using the Euclidean distance between the vectors in a vector space.

Step 3

In step 3, the information processing apparatus 100 selects a model trained by using the data collected in the learning facility having a high similarity degree to the introduction destination facility FAt based on the similarity degree obtained in step 2. For example, in a case where, as a result of the evaluation in step 2, the similarity degree between the learning facility FA1 and the introduction destination facility FAt is small and the similarity degree between the learning facility FA2 and the introduction destination facility FAt is large, the information processing apparatus 100 selects the model M2, from among the candidate models M1 and M2, as a model suitable for the introduction destination facility FAt.

In a case where only the metadata-derived facility characteristic information is used as the facility characteristic information of each facility in the information processing apparatus 100, it is not necessary to acquire the facility related information other-than-metadata EI1, EI2, and EIt in FIG. 11. Further, in a case where only the facility related information other-than-metadata is used as the facility characteristic information of each facility in the information processing apparatus 100, it is not necessary to acquire the metadata-derived facility characteristic information ST1, ST2, and STt in FIG. 11.

Relationship Between Dataset of Each Learning Facility and Model

As shown in FIG. 11 and FIG. 12, the basic idea of a relationship between the dataset, which is collected in each of the learning facilities, and the model is to train one model from one dataset by using only the dataset of the one learning facility, for each dataset. In this case, one dataset, which is used for a training of the model, is the main dataset, and a collection source of this dataset is the main learning facility.

However, it is also possible to train a model by using a dataset that is a mixture of two or more datasets out of a plurality of datasets collected from a plurality of learning facilities that are different from each other. For example, in a case where the model is trained by using a dataset of 10,000 records of behavior history collected at the learning facility 1 and a dataset of 100 records of behavior history collected at the learning facility 2, most of the dataset used for the training of the model is the data of the learning facility 1, and the proportion of the data of the learning facility 2 is relatively very small. In such a case, it is recognized that the dataset collected by the learning facility 1 is the main dataset and the learning facility 1 is the main learning facility. A model trained under such a condition has high prediction performance in the learning facility 1 which is the main learning facility. Therefore, as for a model trained by using a plurality of datasets collected from a plurality of learning facilities, adoption or rejection of the model may be determined based on a similarity degree between the characteristic of the introduction destination facility and the characteristic of the main learning facility.

Further, in a case where a plurality of main learning facilities are present for one model, adoption or rejection of the model may be determined based on a representative value such as an average value, a maximum value, or a minimum value of similarity degrees between the characteristic of the introduction destination facility and the characteristics of each of the main learning facilities. For example, in a case where the model is trained by using datasets including a dataset of 5,000 records of behavior history collected at the learning facility 1 and a dataset of 5,000 records of behavior history collected at the learning facility 2, since a ratio of the data of the learning facility 1 and the ratio of the data of the learning facility 2 in the dataset of all the data used for the training of this model are equivalent, it is difficult to specify only one learning facility as the main learning facility. In such cases, each of learning facility 1 and learning facility 2 is treated as the main learning facility, and by using methods such as obtaining an average value of a similarity degree between the characteristic of the introduction destination facility and the characteristic of the learning facility 1 and a similarity degree between introduction destination facility and the learning facility 2, and obtaining a maximum value or a minimum value, the similarity degrees of the characteristic of the facility with respect to a combination of the plurality of learning facilities may be evaluated and adoption or rejection of the model may be determined based on the evaluation result.

In a case where a model is trained by using a dataset that is a mixture of two or more datasets from among a plurality of datasets collected at a plurality learning facilities, a dataset of a learning facility having the largest ratio of the amount of data for each learning facility to the total amount of data used for the training can be the "main dataset". On the other hand, a dataset of a learning facility where the ratio of the amount of data for each learning facility to the total amount of data used for the training is less than a reference value may be excluded from the "main dataset". The reference value may be appropriately set within a range of technical purposes as a criterion for determining whether or not a contribution degree of the dataset to the training can be considered to be relatively extremely small, and, for example, may be 10% or 5%. A dataset of a learning facility where the ratio of the amount of data to the total amount of data used for the training is equal to or greater than the reference value can be the "main dataset".

Further, in a case where a model is trained by using the dataset that is a mixture of two or more datasets from among the plurality of datasets collected at the plurality of learning facilities, a ratio of the amount of data for each learning facility to the total amount of data used for the training is regarded as a weight, and by using methods such as obtaining a weighted average of the similarity degrees between the characteristic of the introduction destination facility and the characteristic of each learning facility, the similarity degrees of the characteristic of the facility with respect to a combination of the plurality of learning facilities may be evaluated and adoption or rejection of the model may be determined based on the evaluation result.

Outline of Information Processing Apparatus

Figure 13:
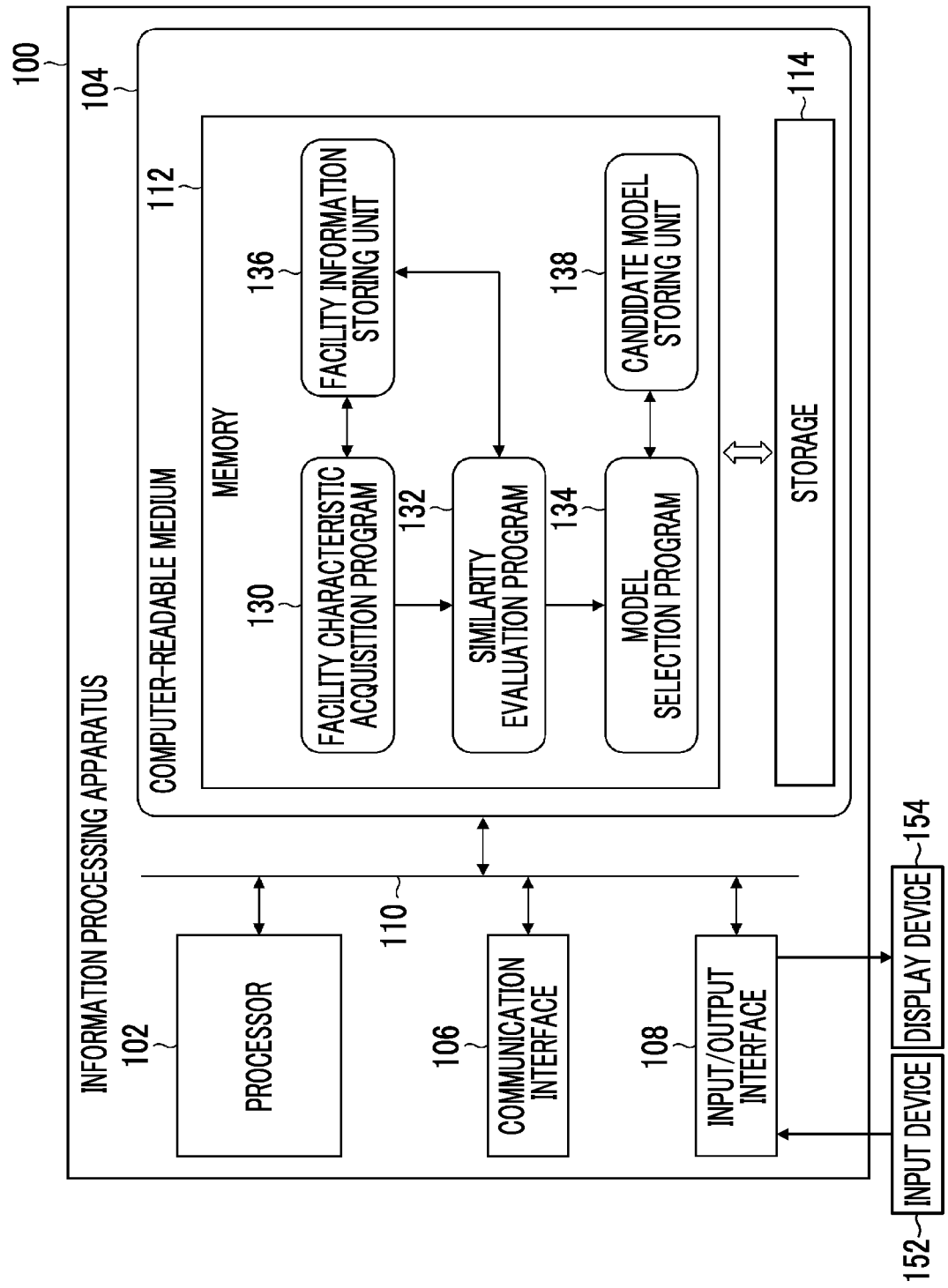
FIG. 13 is a block diagram schematically showing an example of a hardware configuration of the information processing apparatus.

FIG. 13 is a block diagram schematically showing an example of a hardware configuration of an information processing apparatus 100 according to an embodiment. The information processing apparatus 100 can be realized by using hardware and software of a computer. The physical form of the information processing apparatus 100 is not particularly limited, and may be a server computer, a workstation, a personal computer, a tablet terminal, or the like. Although an example of realizing a processing function of the information processing apparatus 100 using one computer will be described here, the processing function of the information processing apparatus 100 may be realized by a computer system configured by using a plurality of computers.

The information processing apparatus 100 includes a processor 102, a computer-readable medium 104 that is a non-transitory tangible object, a communication interface 106, an input/output interface 108, and a bus 110.

The processor 102 includes a central processing unit (CPU). The processor 102 may include a graphics processing unit (GPU). The processor 102 is connected to the computer-readable medium 104, the communication interface 106, and the input/output interface 108 via the bus 110. The processor 102 reads out various programs, data, and the like stored in the computer-readable medium 104 and executes various processes. The term program includes the concept of a program module and includes instructions conforming to the program.

The computer-readable medium 104 is, for example, a storage device including a memory 112 which is a main memory and a storage 114 which is an auxiliary storage device. The storage 114 is configured using, for example, a hard disk drive (HDD) device, a solid state drive (SSD) device, an optical disk, a photomagnetic disk, a semiconductor memory, or an appropriate combination thereof. Various programs, data, or the like are stored in the storage 114.

The memory 112 is used as a work area of the processor 102 and is used as a storage unit that temporarily stores the program and various types of data read from the storage 114.

By loading the program that is stored in the storage 114 into the memory 112 and executing instructions of the program by the processor 102, the processor 102 functions as a unit for performing various processes defined by the program.

The memory 112 stores various programs such as a facility characteristic acquisition program 130, a similarity degree evaluation program 132, and a model selection program 134 executed by the processor 102, and various data.

The facility characteristic acquisition program 130 is a program that executes a process of acquiring information indicating the characteristics of the learning facility and introduction facility. The facility characteristic acquisition program 130 may acquire information indicating the characteristic of the learning facility, for example, by performing a statistical process on the data included in the dataset collected at the learning facility. Further, for example, the facility characteristic acquisition program 130 may receive an input of information indicating the characteristic of the facility via a user interface or may include a web crawling program that automatically collects public information indicating characteristics of facilities from the Internet.

The similarity degree evaluation program 132 is a program that executes a process of evaluating similarity degrees of the facility characteristics between the introduced facility and each of the learning facilities based on the facility characteristic information of each facility. The model selection program 134 is a program that executes a process of selecting a model suitable for the introduction facility from among a plurality of candidate models based on the evaluation result of the similarity degree.

The memory 112 includes a facility information storing unit 136 and a candidate model storing unit 138. The facility information storing unit 136 is a storage area in which facility information, which includes the facility characteristic information of each facility acquired by using the facility characteristic acquisition program 130, is stored. Further, the facility information storing unit 136 may include a storage area in which metadata collected in the introduction destination facility is stored.

The candidate model storing unit 138 is a storage area in which a plurality of trained models, which are trained by using the respective datasets of the plurality of learning facilities, are stored. The candidate model storing unit 138 may include a storage area for storing a dataset used for the training of each model. Further, the candidate model storing unit 138 may include a storage area for storing the facility characteristic information of each learning facility in association with the model.

The communication interface 106 performs a communication process with an external device by wire or wirelessly and exchanges information with the external device. The information processing apparatus 100 is connected to a communication line (not shown) via the communication interface 106. The communication line may be a local area network, a wide area network, or a combination thereof. The communication interface 106 can play a role of a data acquisition unit that receives input of various data such as the dataset.

The information processing apparatus 100 may include an input device 152 and a display device 154. The input device 152 and the display device 154 are connected to the bus 110 via the input/output interface 108. The input device 152 may be, for example, a keyboard, a mouse, a multi-touch panel, or other pointing device, a voice input device, or an appropriate combination thereof. The display device 154 may be, for example, a liquid crystal display, an organic electroluminescence (OEL) display, a projector, or an appropriate combination thereof. The input device 152 and the display device 154 may be integrally configured as in the touch panel, or the information processing apparatus 100, the input device 152, and the display device 154 may be integrally configured as in the touch panel type tablet terminal.

Figure 14:
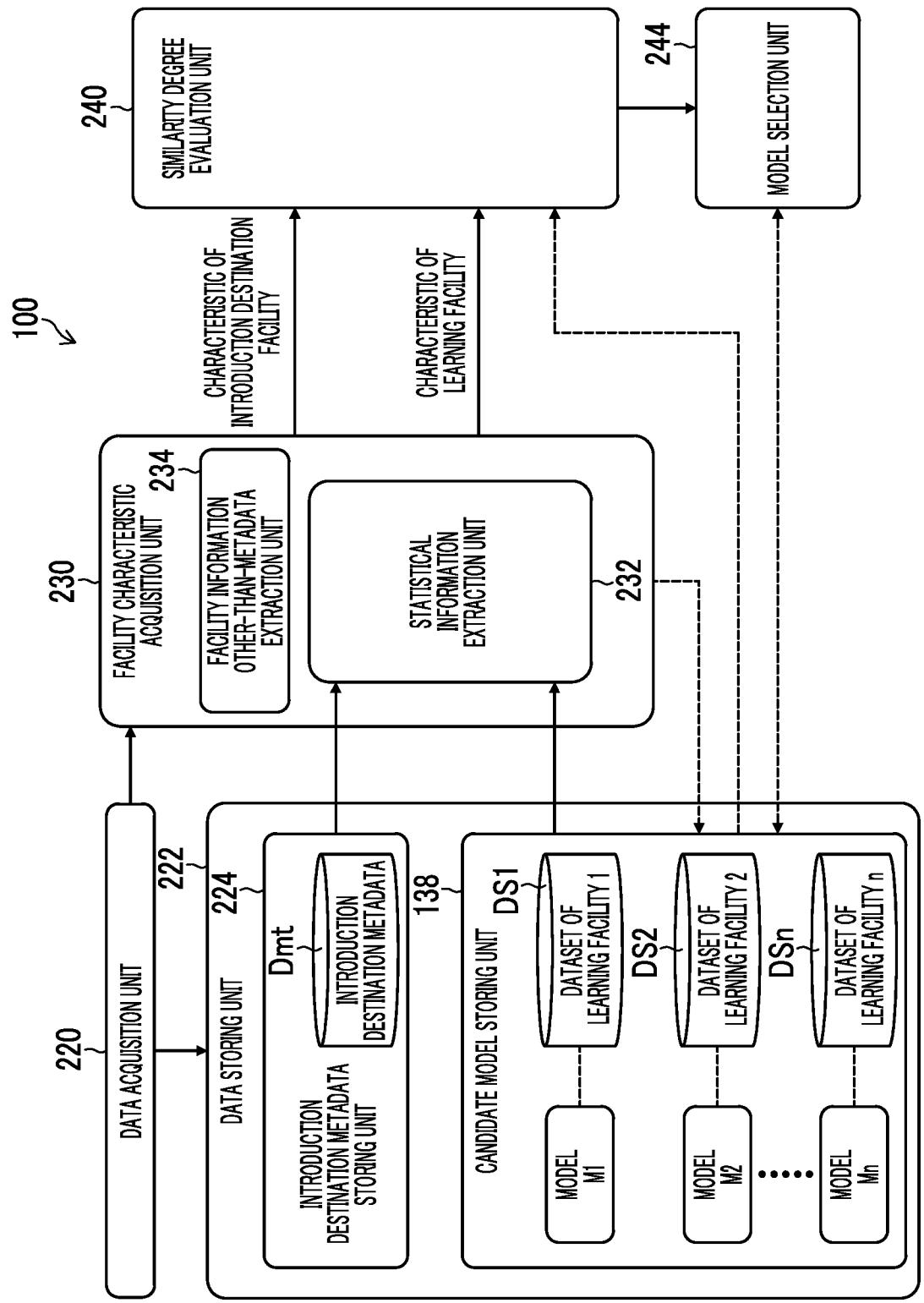
FIG. 14 is a functional block diagram showing a functional configuration of the information processing apparatus.

FIG. 14 is a functional block diagram showing a functional configuration of an information processing apparatus 100. The information processing apparatus 100 includes a data acquisition unit 220, a data storing unit 222, a facility characteristic acquisition unit 230, a similarity degree evaluation unit 240, and a model selection unit 244. The data acquisition unit 220 acquires various data such as metadata for the introduction destination facility FAt. The data acquisition unit 220 may include a communication interface 106.

The data, which is acquired via the data acquisition unit 220, is stored in the data storing unit 222. The data storing unit 222 includes an introduction destination metadata storing unit 224, a candidate model storage unit, and a candidate model storing unit 138. The introduction destination metadata storing unit 224 stores the dataset Dmt of the metadata such as the user attribute and/or the item attribute of the introduction destination facility FAt.

A plurality of candidate models M1, M2 . . . Mn are stored in the candidate model storing unit 138. Further, the datasets DS1, DS2 . . . DSn used for the training of each model may be stored in the candidate model storing unit 138 in association with the model. Here, it is assumed that each of the datasets DS1, DS2 . . . DSn is collected from different learning facilities, and a model Mk (k=1, 2, . . . n) is a model trained by using a dataset DSk collected at a learning facility k. Note that, there may be a case where the dataset, which is used for the training of the model, is not stored because a contract may be made to discard the dataset, which is used for the training of the model, after the model training depending on the learning facility.

The facility characteristic acquisition unit 230 acquires information indicating the characteristics of each of the plurality of learning facilities k and the introduction destination facility FAt. The facility characteristic acquisition unit 230 includes a statistical information extraction unit 232 and a facility information other-than-metadata extraction unit 234. The statistical information extraction unit 232 performs the statistical process on the metadata included in the dataset DSk of each learning facility k and extracts the statistical information such as a statistical value and/or a distribution.

The facility information other-than-metadata extraction unit 234 performs web crawling on the Internet and extracts the facility related information other-than-metadata related to a target facility. Further, the facility information other-than-metadata extraction unit 234 may receive input of information by an operator via the user interface and acquire facility related information other-than-metadata for the target facility.

The similarity degree evaluation unit 240 evaluates similarity degrees between each of the learning facilities k and the introduction destination facility FAt based on the facility characteristic information of each of the learning facilities k and the introduction destination facility FAt.

The model selection unit 244 selects a model suitable for the introduction destination facility FAt from among the plurality of models based on the similarity degree evaluated by the similarity degree evaluation unit 240.

Example of Flowchart

Figure 15:
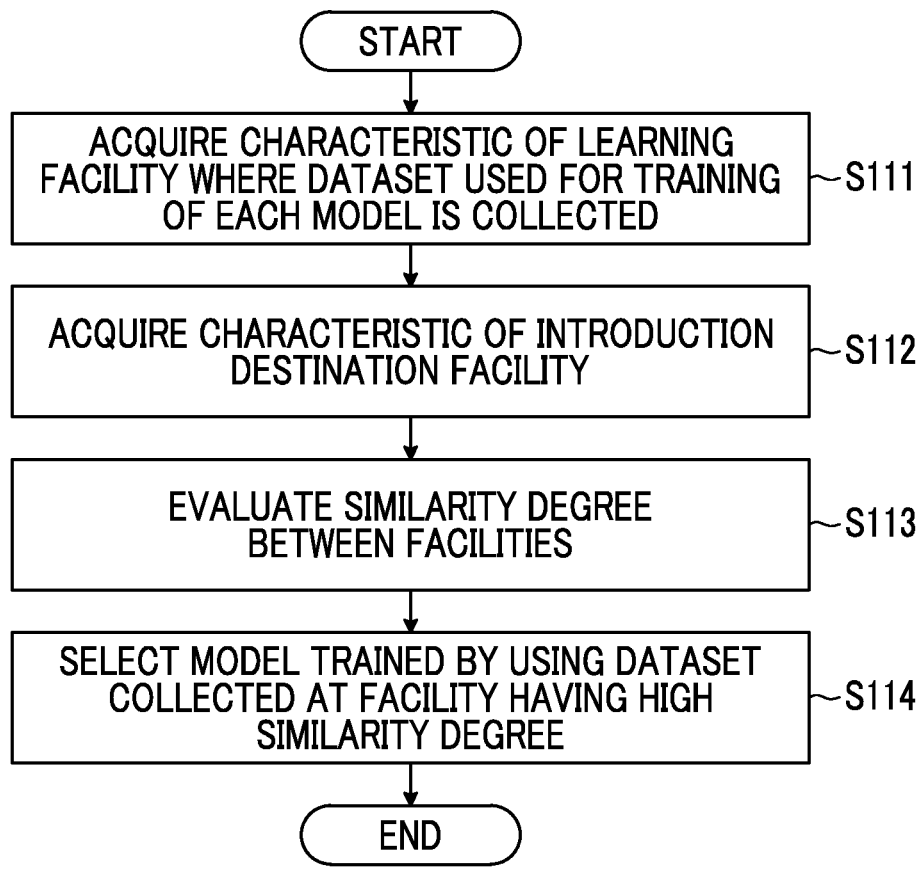
FIG. 15 is a flowchart showing an example of an operation of the information processing apparatus.

FIG. 15 is a flowchart showing an example of an operation of the information processing apparatus 100. It is assumed that a plurality of models Mk (k=1, 2, ... n) trained in advance are prepared. In step S111, in a case where the flowchart in FIG. 15 is started, the processor 102 acquires the characteristic of the learning facility k where the dataset DSk used for the training of each of the prepared models Mk is collected.

In step S112, the processor 102 acquires the characteristic of the introduction destination facility FAt. The order of the processes in step S111 and step S112 may be changed.

In step S113, the processor 102 evaluates the similarity degrees between the facilities of the introduction destination facility FAt and each of the learning facilities k by using the characteristics of each facility acquired in steps S111 and S112.

In step S114, the processor 102 selects a model trained by using the dataset collected at the facility having a high similarity degree to the introduction destination facility FAt. The processor 102 may extract the model, which is trained by using the dataset of the facility having a highest similarity degree, as the optimal model and may extract two or more models, which are trained by using datasets of the facilities that satisfy an acceptance condition of these similarity degree, as models applicable to the introduction destination in a case where a plurality of facilities whose similarity degree is equal to or higher than a reference value (a threshold value) are present. In a case where a plurality of applicable models are extracted to the introduction destination, the processor 102 may present the application candidate models having the higher similarity degree by prioritizing the models in descending order of the similarity degree of the characteristic of the facility and may present the application candidate models together with the evaluation result of the similarity degree. One or more model information selected by the processor 102 is output to a display device 154 or the like as a processing result of a model selection. After step S114, the processor 102 ends the flowchart in FIG. 14.

Specific Application Example

Here, an example of a suggestion system for a retail store will be described. It is assumed that, as data used for a training, there are behavior history (purchase history) data, a user attribute (age), and an item attribute (price) at each of stores of a store 1, a store 2, and a store 3. Each of the store 1 to the store 3 is a learning facility, and is an example of a "first facility" in the present disclosure. The aim is to develop a suggestion system for a newly opened store 4, and it is assumed that behavior history data in the store 4 is not yet present. On the other hand, since the product composition to be sold at the store 4 is fixed, a dataset of an item attribute is present. Further, since store members are recruited in advance prior to the opening, a dataset of a user attribute of the store 4 is also present. The store 4 is an introduction destination facility and is an example of a "second facility" in the present disclosure.

Under the above condition, the information processing apparatus 100 performs the following processes of steps 1 to 4.

Processing Step 1

The processor 102 extracts the respective characteristics of the store 1 to the store 4 from the dataset of the user attribute and the item attribute. For example, average ages of the users extracted from the respective user attributes of the store 1 to the store 4 are 35 years old, 45 years old, 50 years old, and 40 years old, respectively, in order from the store 1 (see FIG. 16). Further, for example, average prices of the items extracted from the respective item attributes of the store 1 to the store 4 are 500 yen, 300 yen, 600 yen, and 400 yen, respectively, in order from the store 1 (see FIG. 17). The characteristic of the store extracted from the dataset may be a statistical value or a distribution extracted from metadata such as an explanatory variable.

Processing Step 2

Next, the processor 102 extracts the characteristics of each of the store 1 to the store 4, not from the dataset of each store, but from external information that is different from the dataset. The processor 102 acquires, for example, a floor area of each store and average annual household incomes of the municipality where each store is located, as the facility related information other-than-metadata (see FIG. 18). The floor areas of each stores from the store 1 to the store 4 are, for example, 1000 $m^2$, 1500 $m^2$, 500 $m^2$, and 2000 $m^2$, respectively, in order from the store 1. Further, the average annual household incomes of the municipality where each store of the store 1 to the store 4 are located is, for example, 6 million yen, 4 million yen, 7 million yen, and 5 million yen, respectively, in order from the store 1. The characteristic of the store extracted from the external information other than the dataset may include various data related to the characteristic of the store itself that is not included in the dataset. Each of the floor area of each store and the average annual household incomes of the municipality where each store is located is an example of "facility related information other-than-metadata" in the present disclosure.

Processing Step 3

The characteristics of each store are represented with a multidimensional vector from a plurality of types of numerical values indicating the characteristics of each store obtained in the processing step 1 and the processing step 2. In the case of the above example, the processor 102 represents the characteristics of each store as a four-dimensional vector of the average age of the users, the average price of the items, the floor area of the store, and the average annual household incomes of the municipality where the store is located. Specifically, characteristic vectors of each of the stores of the store 1 to the store 4 are (35, 500, 1000, 600), (45, 300, 1500, 400), (50, 600, 500, 700), (40, 400, 2000, 500).

Processing Step 4

Next, the processor 102 obtains similarity degrees of the characteristics of each store. In evaluating the similarity degree of the characteristic vectors in a vector space representing the characteristics of stores, in order to align a range of values in each dimension of the vector, the processor 102 obtains an average value and a standard deviation for each dimension and normalizes the values by subtracting the average value from the values in each dimension and dividing the result by the standard deviation.

Thereafter, the processor 102 obtains the Euclidean distance between the respective vectors of the store 4 and the other stores 1 to 3 by using the standardized facility characteristic vectors of each store. The Euclidean distance between vectors is an example of an index (evaluation value) for evaluating the similarity degree of the facility characteristics.

For example, the Euclidean distance between the vectors of the store 4 and the store 1 is 2.05, the Euclidean distance between the vectors of the store 4 and the store 2 is 1.55, and the Euclidean distance between the vectors of the store 4 and the store 3 is 3.55. As a result, it is understood that the store 2 has the highest similarity degree.

Processing Step 5

The processor 102 selects, as a model suitable for the store 4, a model that is trained by using the dataset of the store 2 having the highest similarity degree from the evaluation result of the similarity degree in the processing step 4.

From the similarity degree of the characteristics of the stores, it is expected that the behavior characteristic of the user on the item of the store 2 is closest to that of the store 4 from among the store 1 to the store 3. Therefore, by introducing a model trained by using the dataset of the store 2 into the store 4, it is possible to realize a high performance information suggestion even in the store 4 having no behavior history yet.

Example of Extracting Statistical Information of User Attribute

Figure 16:
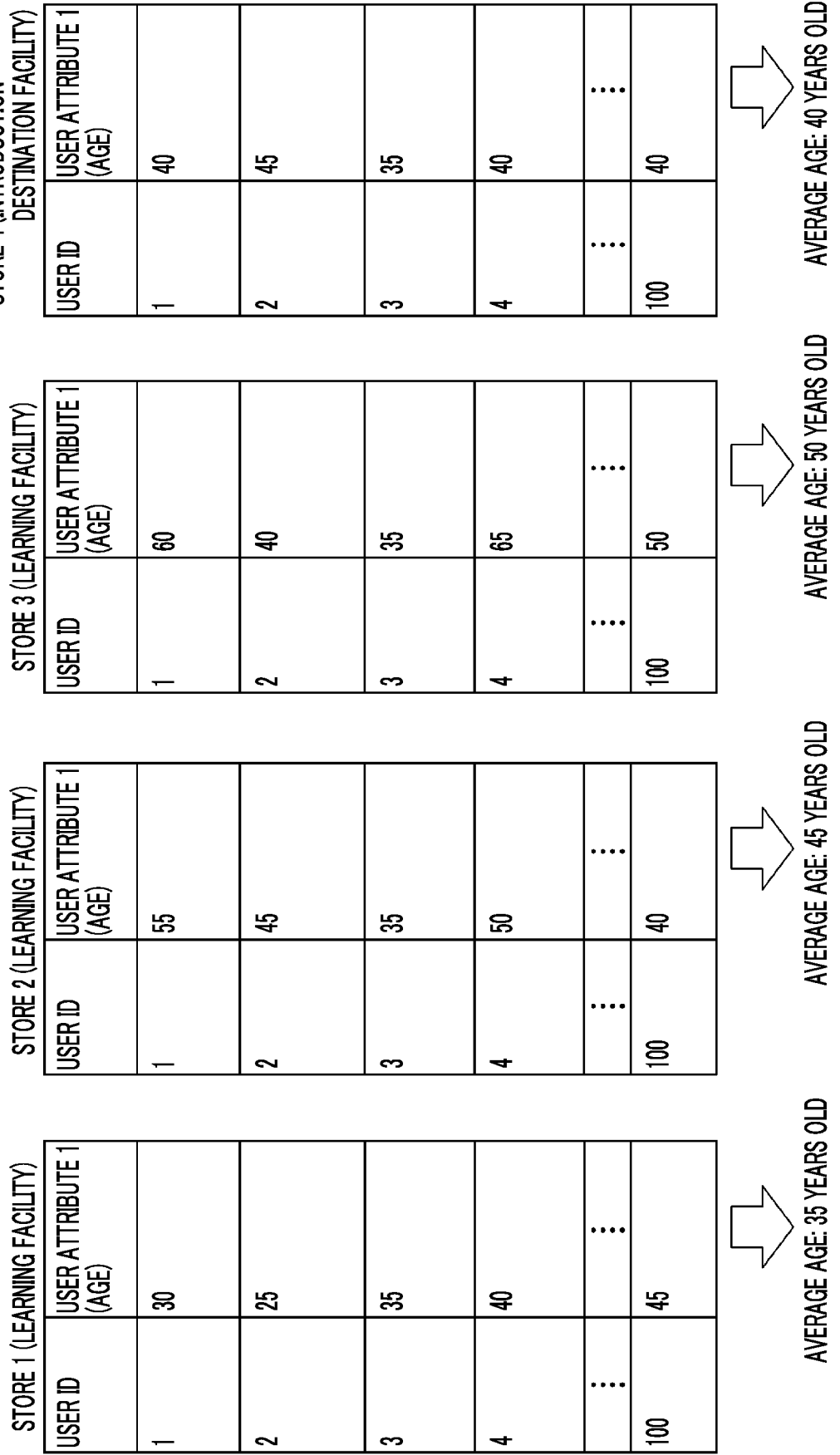
FIG. 16 is an explanatory diagram showing an example in a case where statistical information of a user attribute as a characteristic of a facility is extracted.

FIG. 16 is an explanatory diagram showing an example in a case where statistical information of a user attribute as a characteristic of a facility is extracted. Here, as a specific example of the facility, an example of a store of a retail store such as a supermarket will be shown. As described above, it is assumed that each of the store 1 to the store 3 is a learning facility, and the store 4 is an introduction destination facility. The same applies to FIG. 17 and FIG. 18.

FIG. 16 shows an example of data of "age", which is one of the user attributes of the users of each store (facility) of the store 1 to the store 4.

The processor 102 obtains average ages of the users of each store from the datasets for the user attributes of the users of each store as shown in FIG. 16. The average age is an example of the statistical information and is one of the information indicating the characteristics of each store.

For example, the average age of the users of the store 1 calculated from the data of the user attributes of the store 1 is 35 years old. Similarly, the average age of the users of the store 2 calculated from the data of the user attributes of the store 2 is 45 years old, the average age of the users of the store 3 is 50 years old, and the average age of the users of the store 4 is 40 years old.

The processor 102 may further obtain a standard deviation in each store. Further, the processor 102 may obtain a histogram of the ages or a density distribution of the ages of the users, or the like instead of or in addition to the average age.

Example of Extracting Statistical Information of Item Attribute

Figure 17:
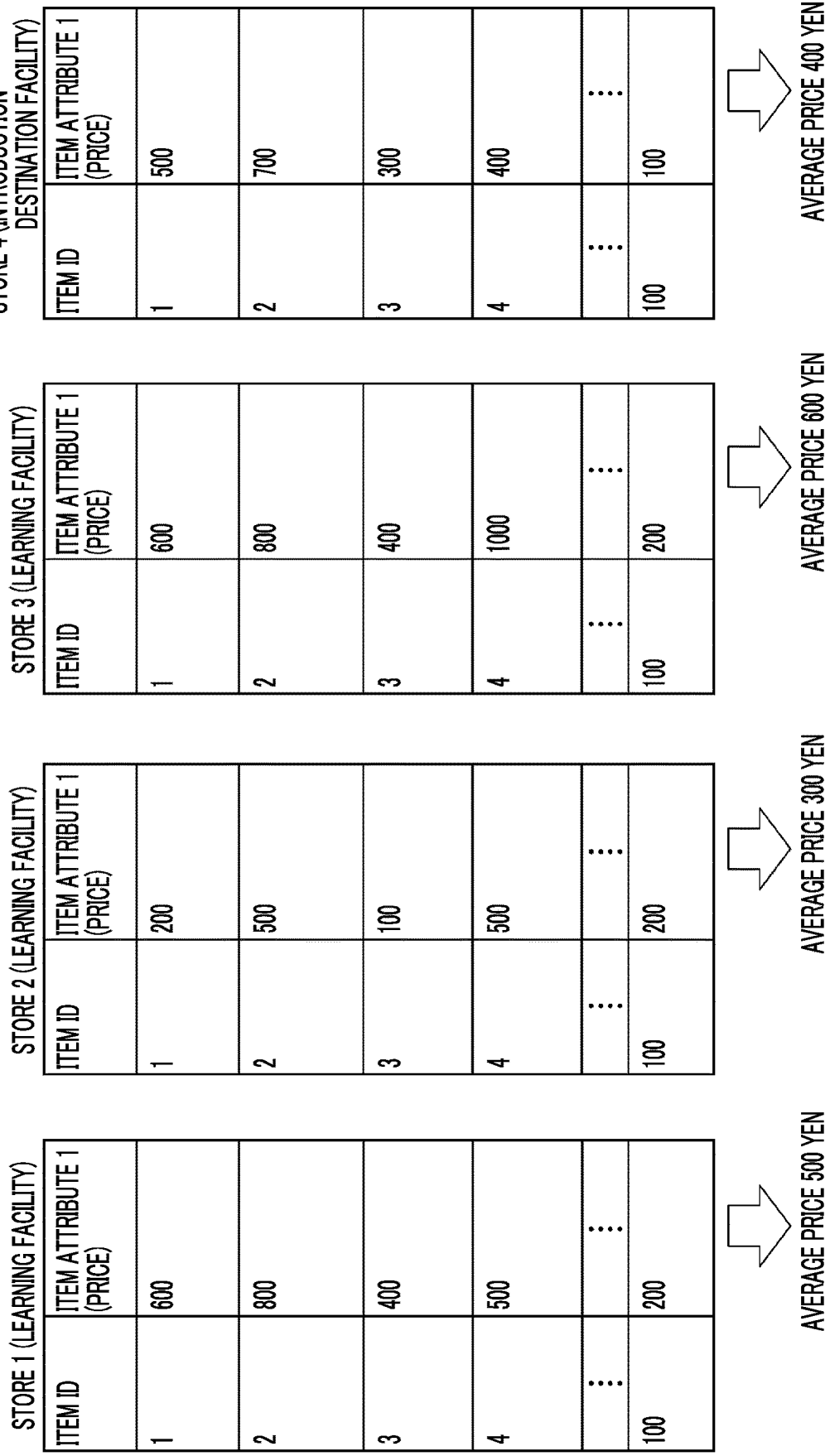
FIG. 17 is an explanatory diagram showing an example in a case where statistical information of an item attribute as a characteristic of a facility is extracted.

FIG. 17 is an explanatory diagram showing an example in a case where statistical information of an item attribute as a characteristic of a facility is extracted. FIG. 17 shows an example of data of "price", which is one of the item attributes of each store (facility) of the store 1 to the store 4.

As shown in FIG. 17, the processor 102 obtains an average price of items of each store from data on prices of the items (here, products) handled in each store. The average price is an example of the statistical information and is one of the information indicating the characteristics of each store.

For example, the average price of the items of the store 1 calculated from the data of the item attributes of the store 1 is 500 yen. Similarly, the average price of the items of the store 2 calculated from the item attributes data of the store 2 is 300 yen, the average price of the items of the store 3 is 600 yen, and the average price of the items of the store 4 is 400 yen.

The processor 102 may further obtain a standard deviation in each store. Further, the processor 102 may obtain a histogram of the prices or a density distribution of the prices of the items, or the like, instead of or in addition to the average price.

Example of Extracting Facility Related Information Other-Than-Metadata

Figure 18:
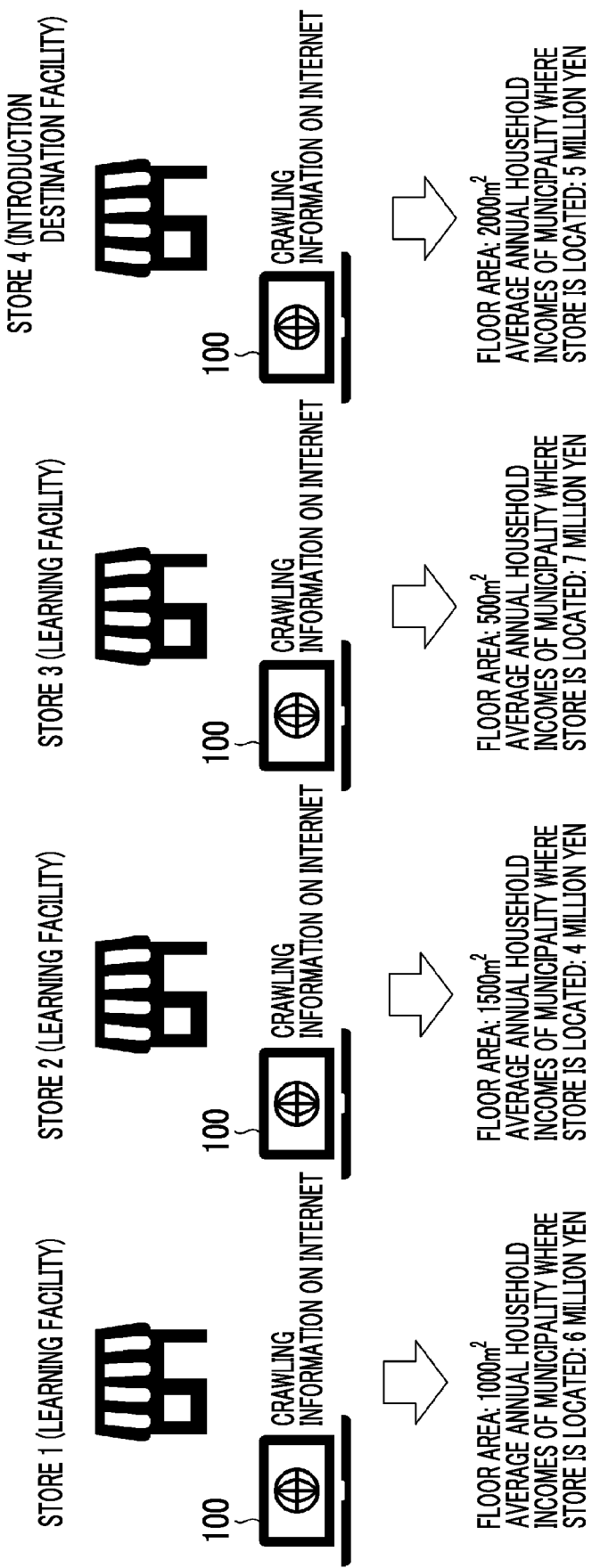
FIG. 18 is an explanatory diagram showing an example in a case where information related to a facility is extracted by performing web crawling.

FIG. 18 is an explanatory diagram showing an example in a case where information related to a facility is extracted by performing web crawling. FIG. 18 shows an example of a case where the facility related information other-than-metadata such as the floor areas of each store and the average annual household incomes of the municipality where the store is located are extracted for each store (facility) of the store 1 to the store 4. The information processing apparatus 100 performs crawling of the information on the Internet and acquires the information on the floor areas of each of the stores 1 to 4 and the information on the average annual household incomes of the municipality where the stores are located. The address and the scale (size) of the store, the average annual household income of the residents in the vicinity of the store, and the like can be characteristics of the store related to the user behavior in the store.

Note that, the information processing apparatus 100 is not limited to the form in which crawling is performed. An information processing apparatus (not shown) other than the information processing apparatus 100 may perform web crawling, and the information processing apparatus 100 may acquire information extracted by the crawling.

Although FIG. 18 shows an example of a store of a retail store, the content of the information to be extracted may differ depending on the type of the target facility. For example, in a case where the facility is a medical facility such as a hospital, the facility characteristic information other than the dataset may include a type of hospital, a scale of a hospital, or a type of medical department provided. The type of hospital may be, for example, a type of a national hospital, a public hospital, a university hospital, a general hospital, or the like, depending on the establishment source. Further, the type of hospital may be a type of a special function hospital categorized by function, a regional medical support hospital, or the like. The scale of the hospital may be, for example, the number of beds.

Second Embodiment

Figure 19:
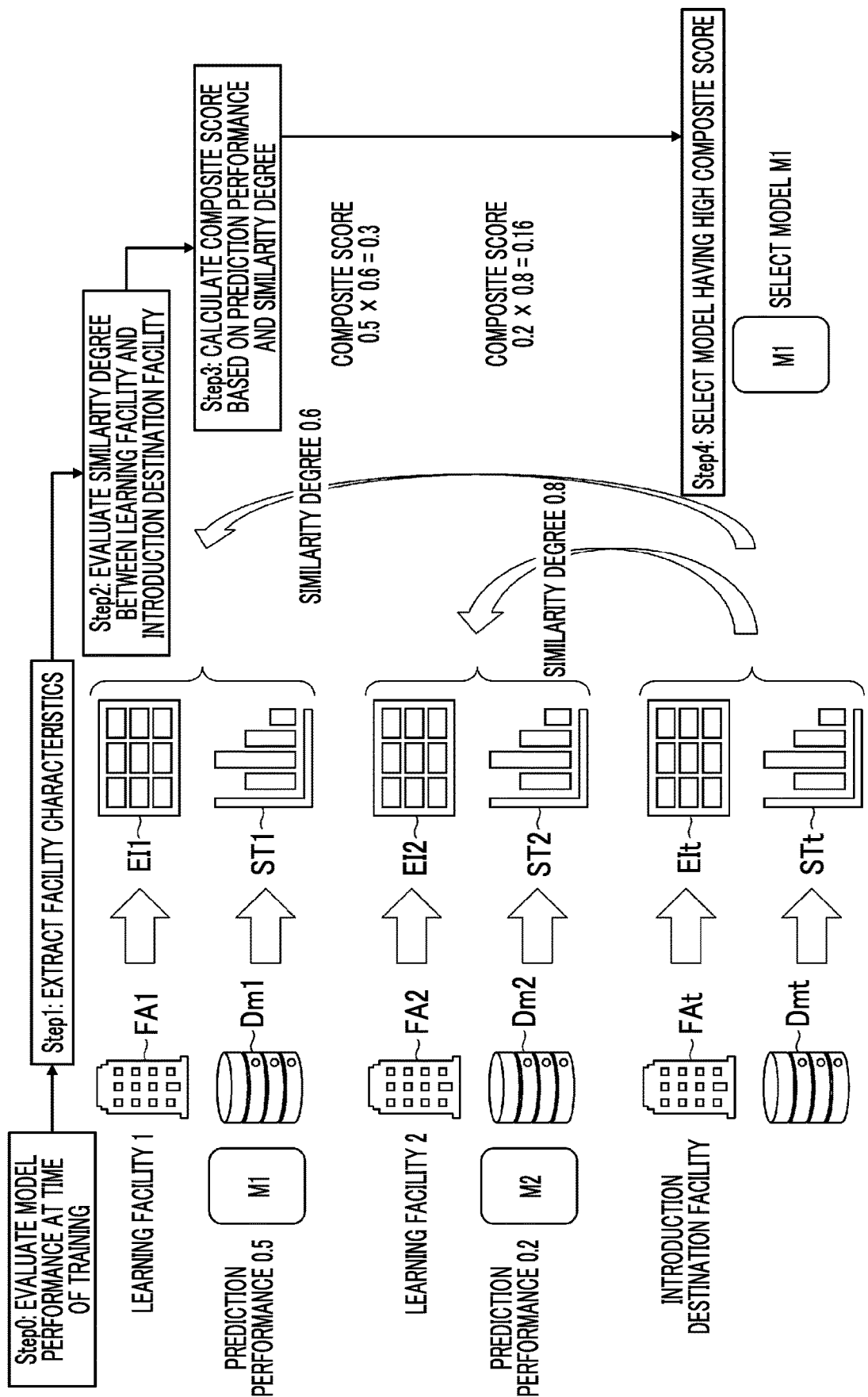
FIG. 19 is an explanatory diagram showing an outline of an information processing method according to a second embodiment.

FIG. 19 is an explanatory diagram showing an outline of an information processing method according to a second embodiment. In FIG. 19, the elements common to those in FIG. 12 are designated by the same reference numerals, and redundant description will be omitted. The preconditions described in FIG. 12 are the same as in FIG. 19. In a second embodiment, step 0 is added before step 1 in FIG. 12, and instead of step 3 in FIG. 12, step 3 and step 4 in FIG. 19 are included.

In the second embodiment, the information processing apparatus 100 performs processes according to the following procedure (steps 0 to 4).

Step 0

In step 0, the information processing apparatus 100 or another machine learning apparatus evaluates the performance of each of models in a case of training each model. The machine learning apparatus may be a computer system different from the information processing apparatus 100. The evaluation data used for an evaluation of the prediction performance of each model may be data collected in the same facility as the dataset used for the training. The prediction performance of the model is quantified by using, for example, an index (evaluation value) such as prediction accuracy. The information processing apparatus 100 stores the evaluation value of the prediction performance of each model in association with the model. For example, it is assumed that the evaluation value indicating the prediction performance of the model M1 is 0.5 and the evaluation value indicating the prediction performance of the model M2 is 0.2.

Step 1 and Step 2

The processes of Step 1 and Step 2 are the same as in FIG. 12.

Step 3

In step 3, the information processing apparatus 100 calculates a composite score based on the prediction performance of the model and the similarity degree between the facilities. Here, although an example of calculating the composite score by taking the product of the evaluation value of the prediction performance and the similarity degree is shown, the average value may be used instead of the product.

Assuming that the similarity degree between the learning facility FA1 and the introduction destination facility FAt is 0.6 and the similarity degree between the learning facility FA2 and the introduction destination facility FAt is 0.8, a composite score based on the prediction performance of the model M1 and the similarity degree of the learning facility FA1 is calculated as 0.3 and a composite score based on the prediction performance of the model M2 and the similarity degree of the learning facility FA2 is calculated as 0.16.

Step 4

In step 4, the information processing apparatus 100 selects a model having a high composite score based on the composite score obtained in step 3. In the example in FIG. 19, the information processing apparatus 100 select the model M1 having a high composite score, from among the models M1 and M2, as a model suitable for the introduction destination facility FAt.

As described above, a configuration may be adopted in which a model is selected in consideration of not only the similarity degree between the facilities but also the prediction performance of each model in each of the learning facilities.

Modification Example

In the second embodiment, although an example is described in which a composite score that takes into account the prediction performance of each model is used, a composite score including some conformity evaluation value for evaluating the conformity of the model at the introduction destination facility FAt may be used instead of or in combination with the prediction performance of the model. The conformity evaluation value may be, for example, the result of a questionnaire to users at the introduction destination facility FAt. The conformity evaluation value based on the result of the questionnaire is an example of the "conformity evaluation information" in the present disclosure.

Example of Measures to be Taken in Case Where Dataset Collected in Learning Facility Becomes Unavailable after Model Learning It is assumed a case where datasets collected at learning facilities and data such as characteristics extracted from those datasets are requested to be discarded after the training due to provisions such as the discard of confidential information under contract, and thereby these data cannot be stored continuously.

In such a case, in evaluating the similarity degree between the facilities, it becomes not possible to use the metadata included in the dataset collected at the learning facility, or to use the statistical value of the metadata. An example of dealing with such a case will be described with reference to FIG. 20.

Figure 20:
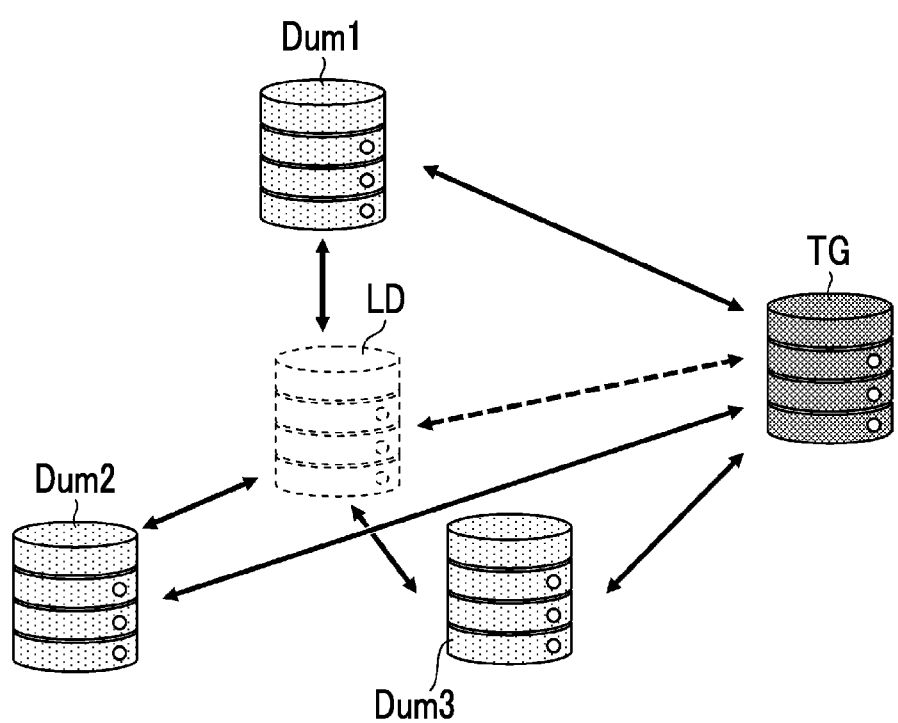
FIG. 20 is an explanatory diagram schematically showing characteristics of each facility in a vector space representing a characteristic of a facility.

FIG. 20 is an explanatory diagram schematically showing characteristics of each facility in a vector space representing a characteristic of a facility. A facility characteristic LD indicated by a broken line in FIG. 20 is data indicating the characteristic of the learning facility that becomes unusable due to being discarded after the training. The learning facility of the facility characteristic LD is referred to as a "non-storing learning facility". In this case, the information processing apparatus 100 may evaluate a similarity degree between the facility characteristic LD of a non-holding learning facility and a facility characteristic TG of the introduction destination facility by using a plurality of facility characteristics Dum1, Dum2, and Dum3 in which similarity degrees with the facility characteristic LD of the non-storing learning facility are evaluated, based on similarity degrees between the facility characteristic TG of the introduction destination facility and each of the plurality of facility characteristics Dum1, Dum2, and Dum3. Each of the plurality of facility characteristics Dum1, Dum2, and Dum3 may be dummy data.

The information processing apparatus 100 or another information processing apparatus can generate the plurality of facility characteristics Dum1, Dum2, and Dum3 based on the facility characteristic LD of the non-storing learning facility. Instead of the facility characteristic LD of the non-storing learning facility, the information processing apparatus 100 can store data of the plurality of facility characteristics Dum1, Dum2, and Dum3 in association with the similarity degree to the facility characteristic LD. Accordingly, it is possible to evaluate the similarity degree with the facility characteristic TG of the introduction destination facility even without the facility characteristic LD of the non-storing learning facility. Each of the plurality of facility characteristics Dum1, Dum2, and Dum3 is an example of a "characteristic of a third facility" in the present disclosure.

Description of Learning Method

Next, a learning method of the model will be described. Here, a case of matrix factorization, which is frequently used in information suggestion, will be described as an example. In the following description, although an example is described in which the information processing apparatus 100 executes a learning process, an apparatus that executes the learning process may be a computer system different from the information processing apparatus 100.

In a case where a dataset including a behavior history of a plurality of users on a plurality of items in a learning facility is present, the processor 102 first trains the dependency between variables based on this data. More specifically, the processor 102 represents the user and the item as vectors, uses a model whose behavior probability is the sum of the respective inner products, and updates parameters of the model so as to minimize a behavior prediction error.

The vector representation of users is represented by, for example, the addition of the vector representation of each attribute of the user. The same applies to the vector representation of items. The model in which the dependency between the variables is trained corresponds to representation of the simultaneous probability distribution $P(X, Y)$ between the response variable Y and each explanatory variable X in the dataset of the given behavior history.

Figure 21:
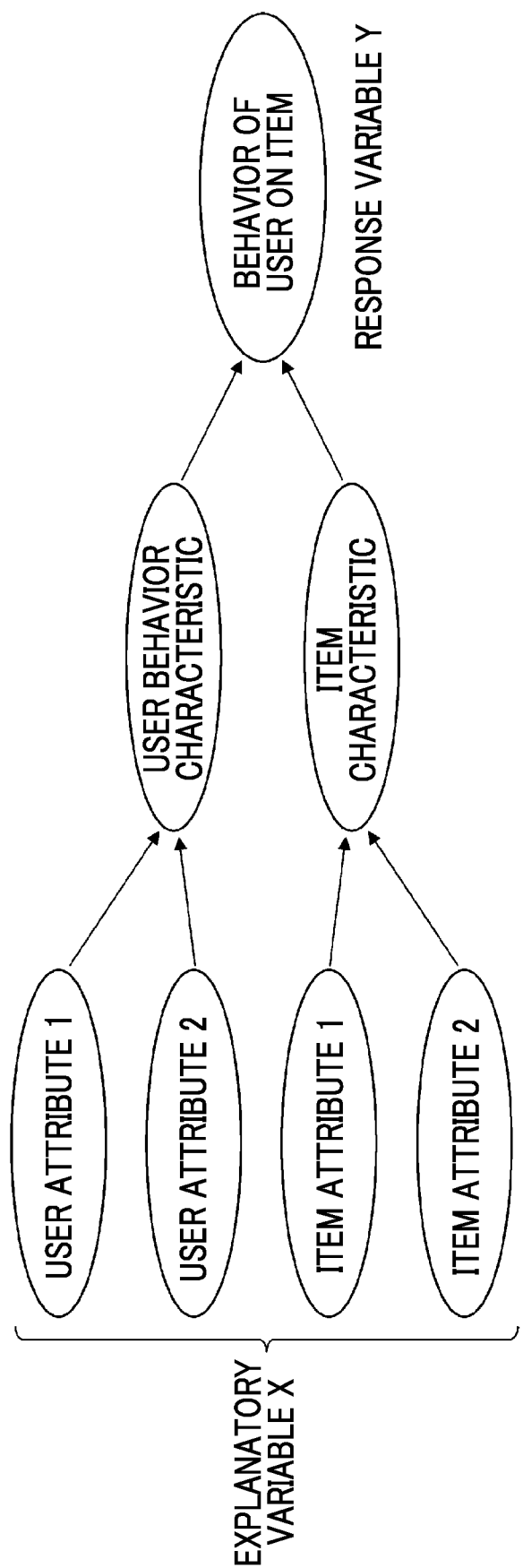
FIG. 21 is an example of a directed acyclic graph (DAG) representing a dependency relationship between variables of a simultaneous probability distribution $P(X, Y)$.

FIG. 21 is an example of a directed acyclic graph (DAG) representing a dependency relationship between variables of a simultaneous probability distribution $P(X, Y)$. FIG. 21 shows an example in which four variables, user attribute 1, user attribute 2, item attribute 1, and item attribute 2, are used as the explanatory variables X. The relationship between each of these explanatory variables X and the behavior of the user on the item, which is the response variable Y, is represented by, for example, a graph as shown in FIG. 21.

In the case of a training, for example, a vector representation of the simultaneous probability distribution P(X, Y) is obtained based on the dependency relationship between variables such as DAG shown in FIG. 21. The graph shown in FIG. 21 shows that the behavior of the user on the item, which is the response variable, depends on the user behavioral characteristic and the item characteristic, shows that the user behavior characteristic depends on user attribute 1 and user attribute 2, and shows that the item characteristic depends on item attribute 1 and item attribute 2.

As shown in FIG. 21, the combination of the user attribute 1 and the user attribute 2 defines the user behavior characteristic. Further, the combination of the item attribute 1 and the item attribute 2 defines the item characteristic. The behavior of the user on the item is defined by a combination of the user behavior characteristic and the item characteristic.

In general, the relationship of P(X, Y)=P(X)×P(Y|X) is established, and in a case where the graph in FIG. 21 is applied to this expression, it is represented as follows.

$P(X)=P$(user attribute 1,user attribute 2,item attribute 1,item attribute 2)

$P(Y|X)=P$(behavior of user on item|user attribute 1,user attribute 2,item attribute 1,item attribute 2)

$P(X,Y)=P$(user attribute 1,user attribute 2,item attribute 1,item attribute 2)×$P$(behavior of user on item|user attribute 1,user attribute 2,item attribute 1,item attribute 2)

Further, the graph shown in FIG. 21 indicates that the elements can be decomposed as follows.

$P(Y|X)=P$(behavior of user on item|user behavior characteristic,item characteristic)×$P$(user behavior characteristic|user attribute 1,user attribute 2)×$P$(item behavior characteristic|item attribute 1,item attribute 2)

Example of Probability Representation of Conditional Probability Distribution P(Y|X)

For example, the probability that the user browses the item (Y=1) is represented by a sigmoid function of the inner product of a user characteristic vector and an item characteristic vector. Such a representation method is called a matrix factorization. The reason why the sigmoid function is adopted is that a value of the sigmoid function can be in a range of 0 to 1 and a value of the function can directly correspond to the probability. The present embodiment is not limited to the sigmoid function, a model representation using another function may be used.

Figure 22:
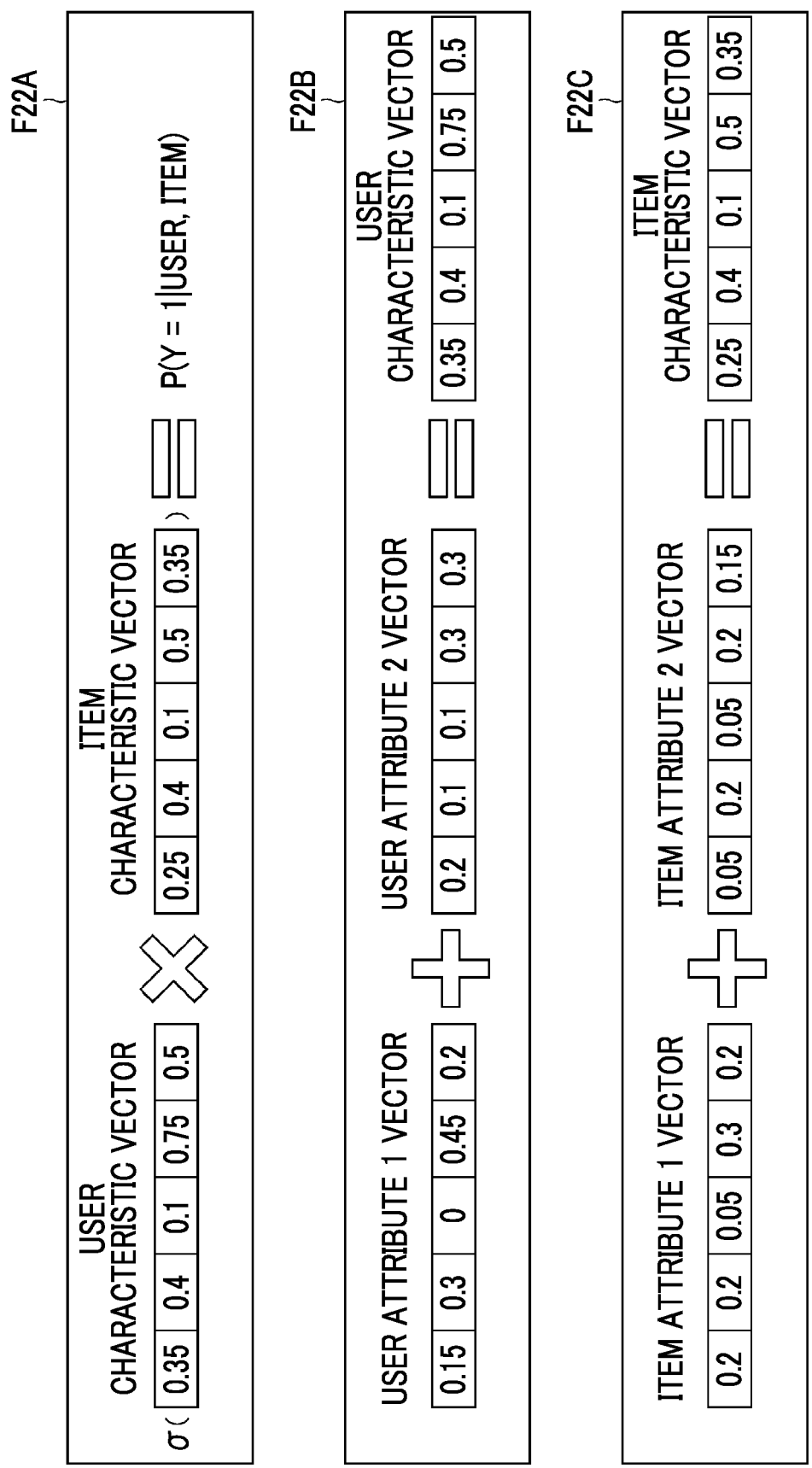
FIG. 22 is a diagram showing a specific example of a probability representation of a conditional probability distribution $P(Y|X)$.

FIG. 22 shows a specific example of the probability representation of P(Y|X). The expression F22A shown in the upper part in FIG. 22 is an example of an expression that represents each of the user characteristic vector θu and the item characteristic vector φi as a five-dimensional vector and represents a sigmoid function $\sigma(\theta u \cdot \varphi i)$ of these inner products $(\sigma u \cdot \varphi i)$ as a conditional probability P(Y=1|user, item) by using the matrix factorization.

"u" is an index value that distinguishes the users. "i" is an index value that distinguishes the items. The dimension of the vector is not limited to 5 dimensions, and is set to an appropriate number of dimensions as a hyper parameter of the model.

The user characteristic vector θu is represented by adding up attribute vectors of the users. For example, as in the expression F22B shown in the middle part in FIG. 22, the user characteristic vector θu is represented by the sum of the user attribute 1 vector and the user attribute 2 vector. Further, the item characteristic vector φi is represented by adding attribute vectors of the items. For example, as in the expression F22C shown in the lower part in FIG. 22, the item characteristic vector φi is represented by the sum of the item attribute 1 vector and the item attribute 2 vector.

Figure 23:
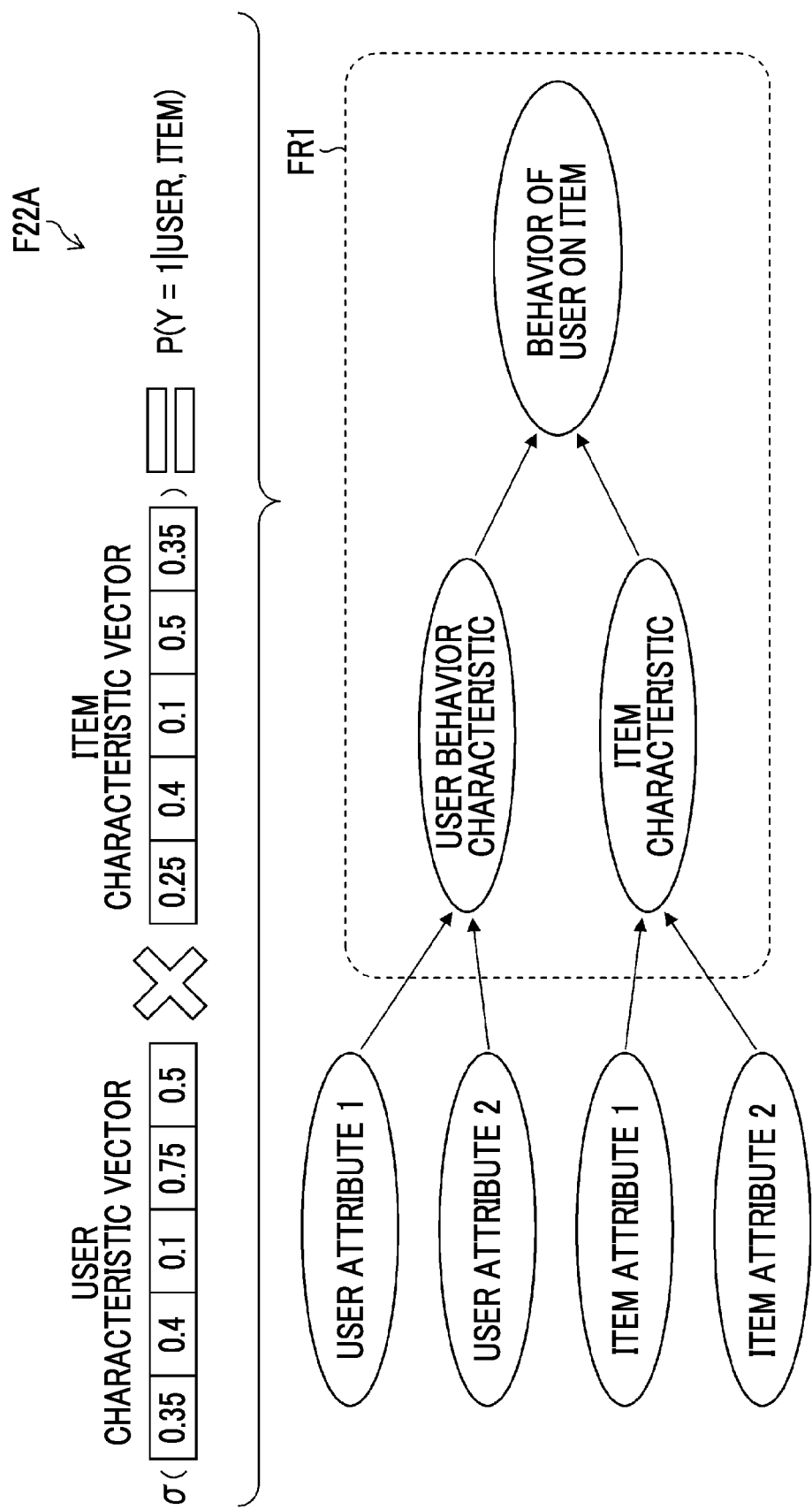
FIG. 23 is an explanatory diagram showing a relationship between an expression, which represents a conditional probability of behaviors of a user on an item (Y=1) for a combination of a user behavior characteristic and an item characteristic, and a DAG representing a dependency relationship between variables of the simultaneous probability distribution P(X, Y).

FIG. 23 is an explanatory diagram showing a relationship between the expression F22A, which represents a conditional probability of a behavior of a user on an item (Y=1) for a combination of a user behavior characteristic and an item characteristic, and a DAG representing a dependency relationship between variables of the simultaneous probability distribution P(X, Y). As shown in FIG. 23, the expression F22A represents the conditional probability of a portion of the DAG shown in FIG. 23 surrounded by a broken line frame FR1.

Figure 24:
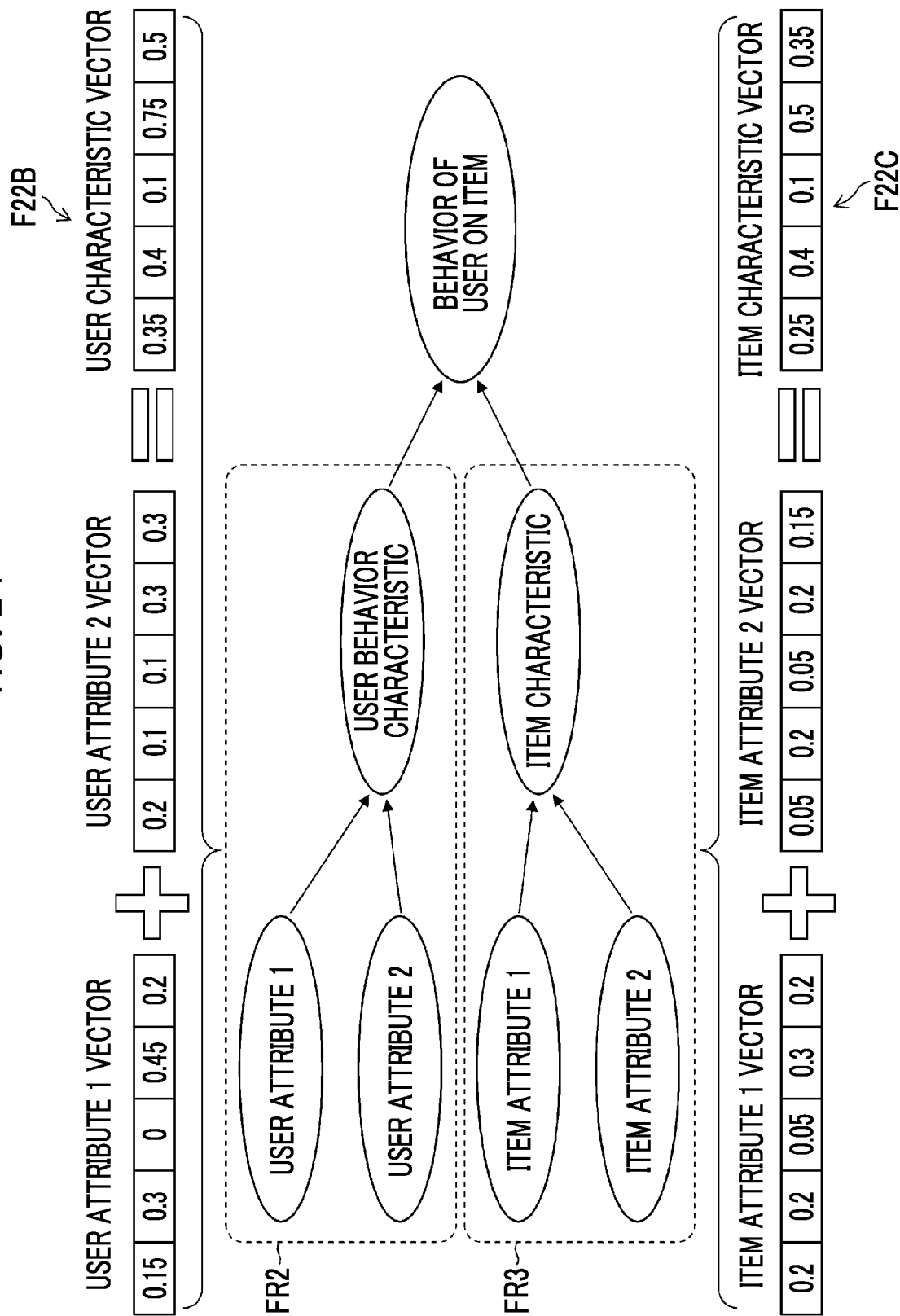
FIG. 24 is an explanatory diagram showing a relationship among a user behavior characteristic defined by a combination of user attribute 1 and user attribute 2, an item behavior characteristic defined by a combination of item attribute 1 and item attribute 2, and a DAG that represents a dependency relationship between variables.

FIG. 24 is an explanatory diagram showing a relationship among a user behavior characteristic defined by a combination of user attribute 1 and user attribute 2, an item characteristic defined by a combination of item attribute 1 and item attribute 2, and a DAG that represents a dependency relationship between variables. As shown in FIG. 24, the expression F22B represents a relationship in a portion surrounded by a frame FR2 indicated by a broken line in the DAG shown in FIG. 24. Further, the expression F22C represents a relationship in a portion surrounded by a frame FR3 indicated by a broken line in the DAG shown in FIG. 24.

A value of each vector shown in FIG. 23 is determined by learning from data (learning data) included in a dataset of a user behavior history of a given domain.

For example, the vector values are updated, for example, by using a stochastic gradient descent (SGD) such that, P(Y=1|user, item) becomes large for a pair of browsed user and item, and P(Y=1|user, item) becomes small for a pair of non-browsed user and item.

In the case of the simultaneous probability distributions P(X, Y) shown in FIG. 23 and FIG. 24, the parameters to be trained from the data are as shown below.

User characteristic vector: θu
Item characteristic vector: φi
User attribute 1 vector: $Vk\_u^1$
User attribute 2 vector: $Vk\_u^2$
Item attribute 1 vector: $Vk\_i^1$
Item attribute 2 vector: $Vk\_i^2$ However, these parameters satisfy the following relationships.

$\theta u = Vk\_u^1 + Vk\_u^2$ $\varphi i = Vk\_i^1 + Vk\_i^2$

"k" is an index value that distinguishes the attributes. For example, assuming that the user attribute 1 has 10 types of belonging department, the user attribute 2 has age group 6 levels, the item attribute 1 has 20 types of product type, and the item attribute 2 has 5 product price types, since the types of attributes are 10+6+20+5=41, the possible value of "k" is 1 to 41. For example, in a case where k=1, it corresponds to a sales department of the user attribute 1, and an index value of the user attribute 1 of the user "u" is represented as $k\_u^1$.

The values of each of the vectors of the user attribute 1 vector Vk_u^1, the user attribute 2 vector Vk_u^2, the item attribute 1 vector Vk_i^1, and the item attribute 2 vector Vk_i^2 are obtained by training from the learning data.

As a loss function in the case of a training, for example, logloss that is represented by the following Equation (1) is used.

$$L=-\{Y_{ui} \log \sigma(\theta u \cdot \varphi i)+(1-Y_{ui})\log(1-\sigma(\theta u \cdot \varphi i))\} \quad (1)$$

In a case where the user "u" browses the item "i", =1, and the larger the prediction probability $\sigma(\theta u \cdot \varphi i)$, the smaller the loss L. On the contrary, in a case where the user "u" does not browse the item "i", =0, and the smaller $\sigma(\theta u \cdot \varphi i)$ is, the smaller the loss L is.

The parameters of the vector representation are trained such that the loss L is reduced. For example, in a case where optimization is performed by using the stochastic gradient descent, one record is randomly selected from all the learning data (one u-i pair is selected out of all u-i pairs in the case of not dependent on the context), the partial derivative (gradient) of each parameter of the loss function is calculated with respect to the selected records, and the parameter is changed such that the loss L becomes smaller in proportion to the magnitude of the gradient.

For example, the parameter of the user attribute 1 vector (Vk_u^1) is updated according to the following Equation (2).

$$V_{k\_u^\wedge 1} - \alpha \frac{\partial}{\partial V_{k\_u^\wedge 1}} L \quad (2)$$

"$\alpha$" in Equation (2) is a learning speed.

In general, since items with Y=0 are overwhelmingly more than items with Y=1 among many items, in a case where the behavior history data is saved as a table as shown in FIG. 19, only Y=1 is saved, and the pair of user "u" and item "i" that are not included in the behavior history data is trained as Y=0. That is, by storing only the data of the positive example, the negative example can be easily generated as not included in the data of the positive example.

Regarding Model Representation

A method of representing the simultaneous probability distribution of the explanatory variable X and the response variable Y is not limited to matrix factorization. For example, instead of the matrix factorization, logistic regression, Naive Bayes, or the like may be applied. In the case of any prediction model, by performing calibration such that an output score is close to the probability P(Y|X), it can be used as a method of the simultaneous probability distribution representation. For example, a support vector machine (SVM), a gradient boosting decision tree (GDBT), and a neural network model having any architecture can also be used.

Regarding Program that Operates Computer

It is possible to record a program, which causes a computer to realize some or all of the processing functions of the information processing apparatus 100, in a computer-readable medium, which is an optical disk, a magnetic disk, or a non-temporary information storage medium that is a semiconductor memory or other tangible object, and provide the program through this information storage medium.

Further, instead of storing and providing the program in a non-transitory computer-readable medium such as a tangible object, it is also possible to provide a program signal as a download service by using a telecommunications line such as the Internet.

Further, some or all of the processing functions in the information processing apparatus 100 may be realized by cloud computing or may be provided as a software as a service (SaaS).

Regarding Hardware Configuration of Each Processing Unit

The hardware structure of the processing unit that executes various processes such as the data acquisition unit 220, the facility characteristic acquisition unit 230, the statistical information extraction unit 232, the facility information other-than-metadata extraction unit 234, the similarity degree evaluation unit 240, and the model selection unit 244 in the information processing apparatus 100 is, for example, various processors as described below.

Various processors include a CPU, which is a general-purpose processor that executes a program and functions as various processing units, GPU, a programmable logic device (PLD), which is a processor whose circuit configuration is able to be changed after manufacturing such as a field programmable gate array (FPGA), a dedicated electric circuit, which is a processor having a circuit configuration specially designed to execute specific processing such as an application specific integrated circuit (ASIC), and the like.

One processing unit may be composed of one of these various processors or may be composed of two or more processors of the same type or different types. For example, one processing unit may be configured with a plurality of FPGAs, a combination of CPU and FPGA, or a combination of CPU and GPU. Further, a plurality of processing units may be composed of one processor. As an example of configuring a plurality of processing units with one processor, first, as represented by a computer such as a client or a server, there is a form in which one processor is configured by a combination of one or more CPUs and software, and this processor functions as a plurality of processing units. Second, as represented by a system on chip (SoC) or the like, there is a form in which a processor, which implements the functions of the entire system including a plurality of processing units with one integrated circuit (IC) chip, is used. In this way, the various processing units are configured by using one or more of the above-mentioned various processors as a hardware-like structure.

Further, the hardware-like structure of these various processors is, more specifically, an electric circuit (circuitry) in which circuit elements such as semiconductor elements are combined.

Advantages of Embodiment

According to each embodiment described above, even in a case where the behavior history data of a user on an item at the introduction destination facility different from a facility, where the dataset used for the training of the model is collected, cannot be used for the performance evaluation of the model, it is possible to select a model suitable for the introduction destination facility from among the plurality of models, based on the similarity degrees of the characteristics of facilities.

According to each embodiment, in a case where a domain of the facility or the like where the data used for a model learning is collected (learning domain) and a domain of the facility or the like, which is a model destination (introduction destination domain) are different from each other, it is possible to realize the provision of a suggestion item list that is robust against domain shifts.

Other Application Examples

In the above-mentioned embodiment, although the user purchasing behavior at a retail store is described as an example, the scope of application of the present disclosure is not limited to this example, and for example, the present disclosed technology can be applied to models that predict user behavior regarding various items, regardless of the application, such as browsing of document browse at companies, browsing of medical images and various documents at medical facilities such as hospitals, or viewing content such as videos on content providing sites, or the like.

Others

The present disclosure is not limited to the above-described embodiment, and various modifications can be made without departing from the spirit of the idea of the present disclosed technology.

EXPLANATION OF REFERENCES

10: suggestion system
12: prediction model
14: model
100: information processing apparatus
102: processor
104: computer-readable medium
106: communication interface
108: input/output interface
110: bus
112: memory
114: storage
130: facility characteristic acquisition program
132 similarity degree evaluation program
134: model selection program
136: facility information storing unit
138: candidate model storing unit
152: input device
154: display device
220: data acquisition unit
222: data storing unit
224: introduction destination metadata storing unit
230: facility characteristics acquisition unit
232: statistical information extraction unit
234: facility information other-than-metadata extraction unit
240 similarity degree evaluation unit
244: model selection unit
DS1: dataset
DS2: dataset
DS3: dataset
Dtg: data
Dm1: dataset
Dm2: dataset
Dmt: dataset
Dum1: facility characteristic
Dum2: facility characteristic
Dum3: facility characteristic
LD: facility characteristic
TG: facility characteristic
EI1: facility related information
EI2: facility related information
EIt: facility related information
ST1: facility characteristic information
ST2: facility characteristic information
STt: facility characteristic information
TG: facility characteristic
F22A: expression
F22B: expression
F22C: expression
FR1: frame
FR2: frame
FR3: frame
IT1: item
IT2: item
IT3: item
M1: model
M2: model
Mn: model
S111 to S114: step of process performed by information processing apparatus

What is claimed is:

1. An information processing method comprising:
preparing a plurality of models, wherein each of the plurality of models is respectively trained by using one or more of datasets including a behavior history of a user on an item, and wherein each of the plurality of models is respectively collected at a different first facility among a plurality of first facilities different from each other; and
causing one or more processors to include:
acquiring a characteristic of a second facility, which is different from the plurality of first facilities and acquiring a characteristic of each of the plurality of first facilities;
evaluating a similarity degree between the acquired characteristic of the second facility and the characteristic of each of the plurality of first facilities; and
selecting a model for the second facility from among the plurality of models based on the similarity degrees, wherein the selected model corresponds to the first facility having a highest similarity degree.

2. The information processing method according to claim 1, further comprising:
causing the one or more processors to include extracting statistical information of a dataset of metadata that is an explanatory variable used for the training of the model,
wherein the characteristic includes the statistical information.

3. The information processing method according to claim 2,
wherein the metadata includes at least one of a user attribute or an item attribute.

4. The information processing method according to claim 1, further comprising:
causing the one or more processors to include acquiring facility related information other than metadata included in the dataset used for the training of the model,
wherein the characteristic includes the facility related information.

5. The information processing method according to claim 4,
wherein the facility related information is extracted by performing web crawling.

6. The information processing method according to claim 4,
wherein the one or more processors are configured to receive the facility related information via a user interface.

7. The information processing method according to claim 1,
wherein the one or more processors are configured to:
acquire an evaluation value of prediction performance at each of the plurality of first facilities where the dataset, which is used for the training of each of the plurality of models, is collected; and
select a model for the second facility from among the plurality of models based on the similarity degrees and the evaluation values of the prediction performance.

8. The information processing method according to claim 1,
wherein the one or more processors are configured to:
acquire conformity evaluation information indicating an evaluation related to conformity of the model with respect to the second facility, separately from the similarity degrees; and
select a model for the second facility from among the plurality of models based on the similarity degrees and the conformity evaluation information.

9. The information processing method according to claim 8,
wherein the conformity evaluation information includes a result of a questionnaire for a user at the second facility.

10. The information processing method according to claim 1, further comprising:
causing the one or more processors to include evaluating, by using characteristics of a plurality of third facilities for which similarity degrees to the characteristic of each of the plurality of first facilities have been evaluated, a similarity degree between the characteristic of the second facility and the characteristic of each of the plurality of first facilities based on similarity degrees between the characteristic of the second facility and the characteristics of the plurality of third facilities.

11. The information processing method according to claim 10, further comprising:
causing the one or more processors to include storing, in a storage device,
the characteristics of the plurality of third facilities; and
the respective similarity degrees between the characteristic of each of the plurality of facilities and the characteristics of the plurality of third facilities.

12. The information processing method according to claim 1,
wherein the model is a prediction model used in a suggestion system that suggests an item to a user.

13. The information processing method according to claim 1, further comprising:
causing the one or more processors to include storing the plurality of models in a storage device.

14. The information processing method according to claim 13, further comprising:
causing the one or more processors to include storing the characteristic of each of the plurality of first facilities where the dataset, which is used for the training of each of the models, is collected in the storage device in association with the model.

15. The information processing method according to claim 1,
wherein each of the plurality of first facilities and the second facility is a different group of users.

16. The information processing method according to claim 1,
wherein each of the plurality of first facilities and the second facility is a different working domain.

17. An information processing apparatus comprising:
one or more processors; and
one or more storage devices in which an instruction executed by the one or more processors is stored,
wherein a plurality of models, wherein each of the plurality of models is respectively trained by using one or more of datasets including a behavior history of a user on an item, and wherein each of the plurality of models is respectively collected at a different first facility among a plurality of first facilities different from each other, are stored in the storage device, and
the one or more processors are configured to:
acquire a characteristic of a second facility, which is different from the plurality of first facilities and acquire a characteristic of each of the plurality of first facilities;
evaluate a similarity degree between the acquired characteristic of the second facility and the characteristic of each of the plurality of first facilities; and
select a model for the second facility from among the plurality of models based on the similarity degrees, wherein the selected model corresponds to the first facility having a first similarity degree.

18. A non-transitory, computer-readable tangible recording medium which records thereon a program for causing, when read by a computer, the computer to realize:
a function of storing a plurality of models, wherein each of the plurality of model is respectively trained by using one or more of datasets including a behavior history of a user on an item, and wherein each of the plurality of models is respectively collected at a different first facility among a plurality of first facilities different from each other;
a function of acquiring a characteristic of a second facility, which is different from the plurality of first facilities and acquiring a characteristic of each of the plurality of first facilities;
a function of evaluating a similarity degree between the acquired characteristic of the second facility and the characteristic of each of the plurality of first facilities; and
a function of selecting a model for the second facility from among the plurality of models based on the similarity degrees, wherein the selected model corresponds to the first facility having a highest similarity degree.

* * * * *